United States Patent
Deguchi et al.

(10) Patent No.: US 11,079,956 B2
(45) Date of Patent: Aug. 3, 2021

(54) STORAGE SYSTEM AND STORAGE CONTROL METHOD

(71) Applicant: Hitachi, Ltd., Tokyo (JP)

(72) Inventors: Akira Deguchi, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 35 days.

(21) Appl. No.: 16/492,783

(22) PCT Filed: Aug. 3, 2017

(86) PCT No.: PCT/JP2017/028169
§ 371 (c)(1),
(2) Date: Sep. 10, 2019

(87) PCT Pub. No.: WO2019/026221
PCT Pub. Date: Feb. 7, 2019

(65) Prior Publication Data
US 2020/0073572 A1   Mar. 5, 2020

(51) Int. Cl.
*G06F 3/06* (2006.01)

(52) U.S. Cl.
CPC .......... *G06F 3/0641* (2013.01); *G06F 3/065* (2013.01); *G06F 3/0619* (2013.01); *G06F 3/0689* (2013.01)

(58) Field of Classification Search
USPC .................. 711/114, 161, 162; 714/6.22
See application file for complete search history.

(56) References Cited

U.S. PATENT DOCUMENTS

| | | | |
|---|---|---|---|
| 10,310,758 B2 | 6/2019 | Imazaki et al. | |
| 2005/0198450 A1* | 9/2005 | Corrado | G06F 3/0613 711/162 |
| 2005/0210322 A1* | 9/2005 | Corrado | G06F 3/064 714/13 |
| 2014/0317367 A1* | 10/2014 | Abei | G06F 3/0685 711/162 |

FOREIGN PATENT DOCUMENTS

WO  2015/145617 A1  10/2015

* cited by examiner

*Primary Examiner* — Ilwoo Park
(74) *Attorney, Agent, or Firm* — Procopio, Cory, Hargreaves & Savitch LLP

(57) ABSTRACT

A storage system includes a plurality of physical drives and a storage controller connected to the plurality of physical drives to provide one or more volumes. Two or more volume addresses, which are two or more logical addresses, belong to each of the one or more volumes. When copy target data, which is data to be copied, is copied in a volume or between volumes, the storage controller (A) determines whether a copy destination physical drive, which is a physical drive corresponding to a copy destination volume address, is identical to a copy source physical drive which is the destination physical drive corresponding to a copy source volume address, and (B) shifts a storage position of the copy target data such that the copy destination physical drive becomes a physical drive identical to the copy source physical drive if a determination result of (A) is false.

10 Claims, 17 Drawing Sheets

FIG. 6

LOGICAL ADDRESS MANAGEMENT TABLE
281

| LOGICAL ADDRESS /61 | FLASH PAGE STATE /62 | HASH VALUE /63 |
|---|---|---|
| 0 | ALLOCATED | AAA |
| 8192 | ALLOCATED | AAB |
| 16384 | UNALLOCATED | - |
| 24576 | ALLOCATED | AAB |
| ... | ... | ... |

FIG. 7

HASH TABLE
282

| HASH VALUE /71 | BLOCK NUMBER /72 | FLASH PAGE NUMBER /73 | SHARING COUNT /74 |
|---|---|---|---|
| AAA | 0 | 0 | 1 |
| AAB | 0 | 1 | 2 |
| ... | ... | ... | ... |

FIG. 8

BLOCK TABLE
283

| BLOCK NUMBER /81 | FLASH PAGE NUMBER /82 | STATE /83 |
|---|---|---|
| 0 | 0 | FREE |
|  | 1 | VALID |
|  | ... | ... |
| ... | ... | ... |

COMPARATIVE EXAMPLE

FIG. 15
OFFSET MANAGEMENT TABLE
234
| PAGE NUMBER 1501 | OFFSET MANAGEMENT FLAG 1502 | OFFSET VALUE 1503 | START POSITION 1504 | END POSITION 1505 |
|---|---|---|---|---|
| 0 | ON | +256KB | 256KB | - |
| 1 | ON | +256KB | - | - |
| 2 | ON | +256KB | - | 256KB |
| ... | ... | ... | ... | ... |
| 10 | ON | +256KB | 256KB | - |
| 11 | ON | +256KB | - | - |
| 12 | ON | +256KB | - | 256KB |
| | | +512KB | 256KB | - |
| 13 | ON | +512KB | - | 512KB |
| 14 | OFF | - | - | - |
| ... | ... | ... | ... | ... |
FIG. 16
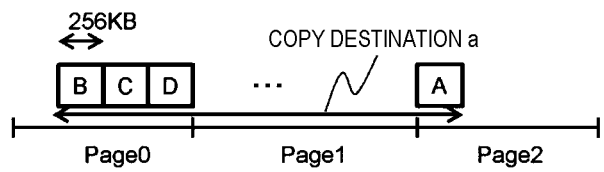
FIG. 17
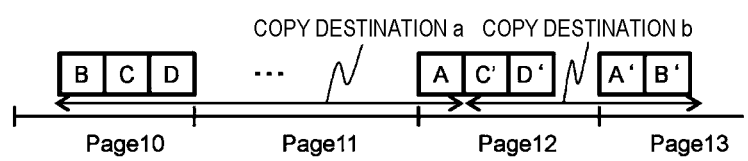

FIG. 21

I/O PATTERN LEARNING TABLE
235

| VOLUME NUMBER (2101) | TIME (2102) | TYPE (2103) | ACCESS ADDRESS (2104) | ACCESS LENGTH (2105) |
|---|---|---|---|---|
| 0 | 9:00:00 | Read | 0 | 256KB |
| 0 | 9:00:01 | Read | 256000 | 256KB |
| 0 | 9:00:02 | Read | 512000 | 256KB |
| 1 | 9:00:01 | Read | 8192 | 8KB |
| 1 | 9:00:04 | Write | 40960 | 8KB |
| 1 | 9:00:09 | Read | 69632 | 4KB |
| ... | ... | ... | ... | ... |

FIG. 22

SEQUENTIAL MANAGEMENT TABLE
239

| SEQUENTIAL ID (2101) | VOLUME NUMBER (2102) | ACCESS ADDRESS (2103) | HASH VALUE (2104) |
|---|---|---|---|
| 0 | 0 | 0 | ABC |
| | | 256000 | DEF |
| | | ... | ... |
| 1 | 6 | 256000 | GHI |
| | | 512000 | JKL |
| | | ... | ... |
| ... | ... | ... | ... |

STORAGE SYSTEM AND STORAGE CONTROL METHOD

CROSS-REFERENCE TO RELATED APPLICATIONS

This application is a U.S. National Stage entry of PCT Application No: PCT/JP2017/028169 filed Aug. 3, 2017, the contents of which are incorporated herein by reference.

TECHNICAL FIELD

The present invention relates generally to storage control.

BACKGROUND ART

In general, a large-capacity storage system provided separately from a host computer that executes an application manages data in computer systems handling a large amount of data. The storage system is a system equipped with one or more physical drives (such as hard disk drives) and saves data written from a host computer. In general, the storage system organizes the one or more physical drives into a unit called a RAID group (also called a parity group) and uses a reliability-enhancing technique such as redundant arrays of independent (or inexpensive) disks (RAID).

In recent years, there is a technique of offloading a part of processing of the storage system on the physical drive side. For example, a physical drive has a compression function and a deduplication function. The deduplication function of the storage system is performed using a processor of the storage system. Offload of the compression function or the deduplication function is that the physical drive mounted in the storage system executes compression and deduplication using a resource in the physical drive. As a result, it is possible to eliminate a resource bottleneck of the processor of the storage system.

PTL 1 discloses a technique of offloading copy processing to a physical drive having a deduplication function. Specifically, the storage system issues a copy command to the physical drive. A copy source address and a copy destination address are designated in the copy command, and each of these addresses is an address (logical address) visible to the storage system. The physical drive receives the copy command, associates one physical address to the two logical addresses, and reports completion.

CITATION LIST

Patent Literature

PTL 1: WO 2015/145617

SUMMARY OF INVENTION

Technical Problem

Since the copy command of data is executed by a host computer or an application, the arrangement inside the storage system is not considered. Thus, the copy source address and the copy destination address do not necessarily correspond to the same physical drive.

When the copy source address and the copy destination address correspond to different physical drives, the storage system needs to read data from a copy source drive (the physical drive to which the copy source address corresponds), and write the data to a copy destination drive (the physical drive to which the copy destination address corresponds). Thus, a bandwidth of the storage system is consumed, which leads to performance degradation. Further, when copy source data and copy destination data are stored on different physical drives, it is difficult to reduce the amount of data using a deduplication function provided in the physical drive. In this manner, the problems of performance degradation and data amount increase occur.

Solution to Problem

A storage system includes a plurality of physical drives and a storage controller connected to the plurality of physical drives to provide one or more volumes. Two or more volume addresses, which are two or more logical addresses, belong to each of the one or more volumes. When copy target data, which is data to be copied, is copied in a volume or between volumes, the storage controller (A) determines whether a copy destination physical drive, which is a physical drive corresponding to a copy destination volume address, is identical to a copy source physical drive which is the destination physical drive corresponding to a copy source volume address, and (B) shifts a storage position of the copy target data such that the copy destination physical drive becomes a physical drive identical to the copy source physical drive if a determination result of (A) is false.

Advantageous Effects of Invention

When a physical drive has a deduplication function, it is possible to expect reduction of the data amount using a deduplication function and to reduce overhead such as copy processing via a controller of the storage system.

BRIEF DESCRIPTION OF DRAWINGS

FIG. 6 is a table illustrating an example of a configuration of a logical address management table.

FIG. 7 is a table illustrating an example of a configuration of a hash table.

FIG. 8 is a table illustrating an example of a configuration of a block table.

FIG. 15 is a table illustrating an example of a configuration of an offset management table.

FIG. 16 is a schematic view of a first specific example according to the offset management table of FIG. 15.

FIG. 17 is a schematic view of a second specific example according to the offset management table of FIG. 15.

FIG. 21 is a table illustrating an example of a configuration of an I/O pattern learning table.

FIG. 22 is a table illustrating an example of a configuration of a sequential management table.

DESCRIPTION OF EMBODIMENTS

Figure 1:
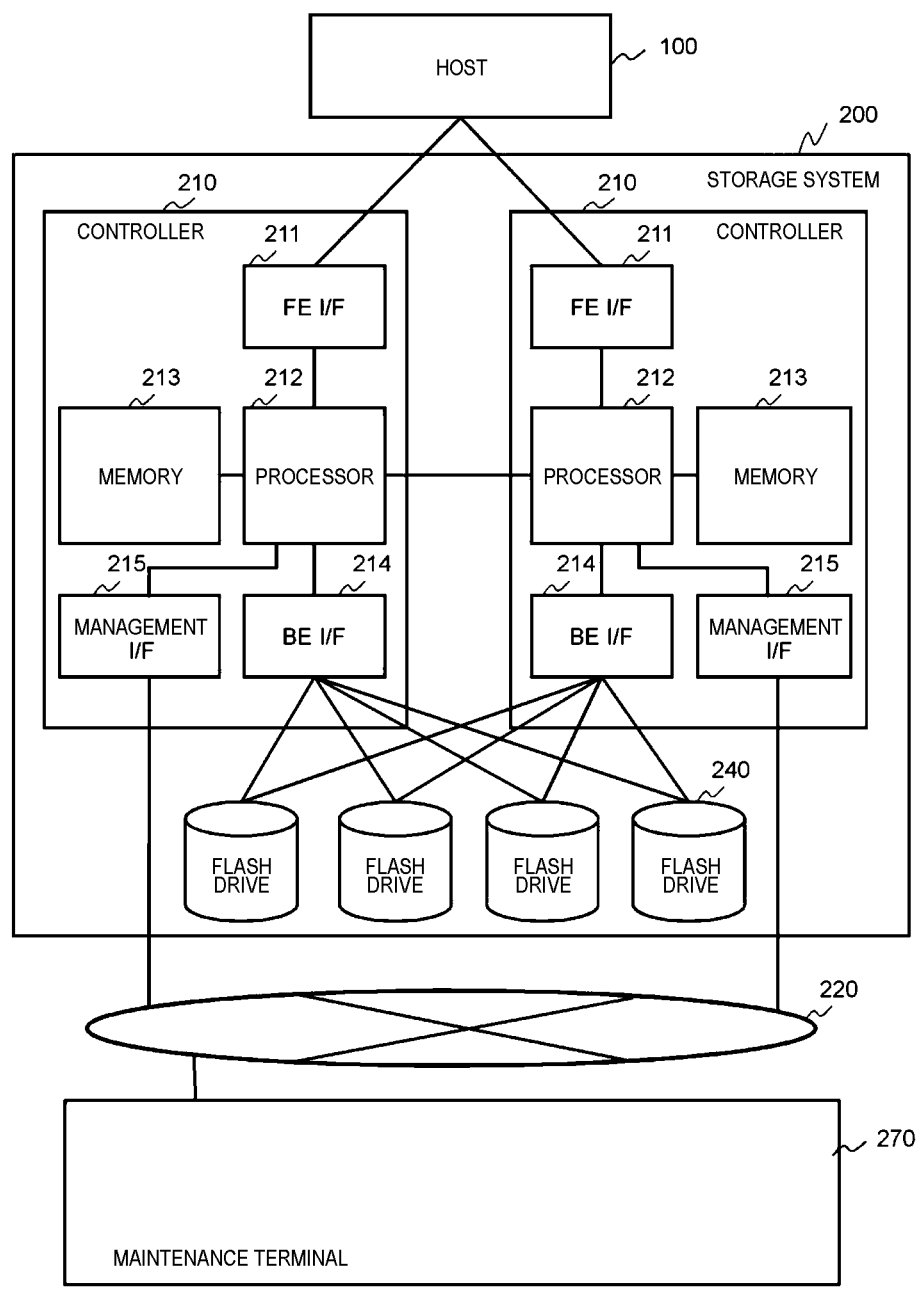
FIG. 1 is a diagram illustrating a configuration of a storage system according to an embodiment.

In the following description, an "interface unit" may include at least one of a user interface unit and a communication interface unit. The user interface unit may include at least one I/O device among one or more I/O devices (for example, an input device (for example, a keyboard and a pointing device) and an output device (for example, a display device) and a display computer. The communication interface unit may be one or more communication interface devices. The one or more communication interface devices may be one or more homogeneous communication interface devices (for example, one or more network interface cards (NICs)), or may be two or more heterogeneous communication interface devices (for example, NIC and a host bus adapter (HBA)).

In addition, a "memory unit" includes one or more memories in the following description. At least one memory may be a volatile memory or a nonvolatile memory. The memory unit is mainly used during processing by a processor unit.

In addition, in the following description, a "processor unit" includes one or more processors. At least one processor is typically a microprocessor such as a central processing unit (CPU). Each of the one or more processors may be a single-core or multi-core processor. The processor unit may include a hardware circuit (for example, a circuit for parity calculation) that performs a part or whole of the processing.

In addition, information will be sometimes described with an expression such as "xxx table" in the following description, but the information may be expressed with any data structure. That is, the "xxx table" can be referred to as "xxx information" in order to indicate that the information is not dependent on the data structure. In addition, in the following description, a configuration of each table is an example, one table may be divided into two or more tables, or all or some of two or more tables may be one table.

In addition, there is a case where processing is described with a "program" as a subject in the following description, but the subject of the processing may be a processor unit (or a device or a system including the processor unit) since the program is executed by the processor to perform the prescribed processing appropriately using a memory unit and/or an interface unit. The program may be installed on a device such as a computer from a program source. The program source may be a recording medium (for example, a non-transitory recording medium) readable by, for example, a program distribution server or a computer. In addition, in the following description, two or more programs may be realized as one program, or one program may be realized as two or more programs.

In addition, in the following description, a "storage system" includes one or more storage devices. At least one storage device may be a general-purpose physical computer. In addition, at least one storage device may be a virtual storage device or may execute software-defined anything (SDx). For example, a software-defined storage (SDS) (an example of a virtual storage device) or a software-defined datacenter (SDDC) can be adopted as the SDx. For example, an SDS as a storage system and a virtual machine as a host computer may be executed on the same computer system (for example, a cloud computing system).

In addition, in the following description, reference signs are used in the case of describing the same type of elements without discrimination, and IDs (for example, identification numbers) of elements are used in the case of discriminating the same type of elements.

In addition, in the following description, a "RAID group" may be a group which is constituted by two or more physical drives and stores data according to an associated RAID level (RAID configuration).

In addition, each of a plurality of types of storage areas in the following description is defined as follows.

A "RAID area" is a logical storage area provided by the RAID group.

A "drive area" is a logical storage area provided by each of a plurality of physical drives. A plurality of drive areas provided by the plurality of physical drives constitute the RAID area.

A "strip" is a part of the drive area. The strip stores a user data set or a parity. The strip in which the user data set is stored can be referred to as a "user strip" and the strip in which the parity is stored can be referred to as a "parity strip". Incidentally, the "user data set" is a part of a user data unit as at least a part of user data (write target data) according to a write request. The "user data unit" is a set of all user data sets corresponding to a stripe. The "parity" is a data set generated based on the user data unit. The "data set" is data stored in one strip, and is the user data set or the parity in the following description. That is, the data set is data in units of strips.

The "stripe" is a storage area constituted by two or more strips (for example, two or more strips of the same logical address) present in two or more drive areas in the RAID area. The stripe is a unit in which a parity is generated.

A "volume" is an abbreviation of a logical volume and is a logical storage area. The volume may be a physical volume (RVOL) or a virtual volume (VVOL). The "RVOL" may be a volume based on physical storage resources (for example, one or more physical drives) of the storage system providing the RVOL. The "VVOL" may be a volume that is constituted by a plurality of virtual areas (virtual storage areas) and conforms to a capacity virtualization technique (typically, thin provisioning).

The architecture serving as a premise of the present embodiment will be described with reference to FIG. 1.

FIG. 1 is a diagram illustrating a configuration of a storage system according to the present embodiment. Incidentally, "I/F" means an interface device in the following description.

A host computer (hereinafter simply referred to as a host) 100 is connected to a storage system 200 via a network (not illustrated). In addition, a maintenance terminal 270 is connected to the storage system 200 via a network 220.

The host 100 is a computer configured to execute an application. The host 100 may be a physical computer or a virtual machine. Although not illustrated, the host 100 is equipped with an I/F configured for connection with the storage system 200, a processor, a memory, and the like, and executes an application.

The storage system 200 includes a plurality of flash drives 240 and a storage controller that controls data input/output with respect to the plurality of flash drives 240. The storage controller includes one or more controllers 210 (two controllers 210 in FIG. 1). The controller 210 includes a frontend I/F (FE I/F) 211, a memory 213, a backend I/F (BE I/F) 214, a management I/F 215, and a processor 212 connected to these units. One or more of these resources (elements) may be mounted on the storage system 200. The FE I/F 211, the BE I/F 214, and the management I/F 215 are examples of the interface unit. The memory 213 is an example of the memory unit. The processor 212 is an example of the processor unit.

The FE I/F 211 is connected to the host 100 via a network and relays communication with the host 100. The FE I/F may have a memory configured to temporarily store data transferred from the host 100 and data to be transferred to the host 100. The storage system 200 may be equipped with different types of the FE I/F 211. For example, an FE I/F for iSCSI and an FE I/F for fibre channel may be present as the two or more FE I/Fs 211.

The memory 213 stores control information to be used by the processor 212 and a program to be executed by the processor 212. In addition, the memory 213 also includes a cache area of data accessed by the host 100. The memory 213 may store other information (data). The memory 213 is generally configured using a dynamic random access memory (DRAM), but may be configured using other storage media. For example, the memory 213 may be a memory such as a magnetoresistive random access memory (MRAM), a ferroelectric random access memory (ReRAM), a phase-change random access memory (PCM), and a NAND flash memory.

The processor 212 executes various processes by executing various programs stored in the memory 213. In addition, the processor 212 also executes various processes using various types of information stored in the memory 213.

The BE I/F 214 is connected to the flash drive 240 and relays communication with the flash drive 240. The processor 212 writes data to the flash drive 240 and reads data from the flash drive 240 via the BE I/F 214.

The flash drive 240 is an example of a physical drive. The physical drive is a physical storage device (a device having a physical storage area) and is typically a nonvolatile storage device (for example, an auxiliary storage device). The physical drive may be, for example, any of a hard disk drive (HDD), a solid state drive (SSD), a digital versatile disc (DVD) drive, and a storage class memory (SCM). The RAID group can be constituted by two or more physical drives (two or more flash drives 240 in the present embodiment).

The management I/F 215 is connected to the maintenance terminal 270 via a network 220 and relays communication with the maintenance terminal 270. The maintenance terminal 270 is a terminal (computer) configured to maintain the storage system 200.

A method of managing data of the storage system 200 and providing a storage area to the host 100 will be described with reference to FIG. 2.

The storage system 200 has a capacity virtualization function. The capacity virtualization function manages one or more flash drives 240 mounted on the storage system 200 as a capacity pool. The host 100 is provided with a virtual volume. When receiving a write request for a virtual volume, the controller 210 secures a page (capacity) from the capacity pool and allocates the page to a write destination area in the virtual volume. The "page" is generally an area having a capacity of several MB to several hundred MB. When the capacity virtualization function is used, it is possible to avoid capacity consumption of a part where page allocation does not occur.

Figure 2:
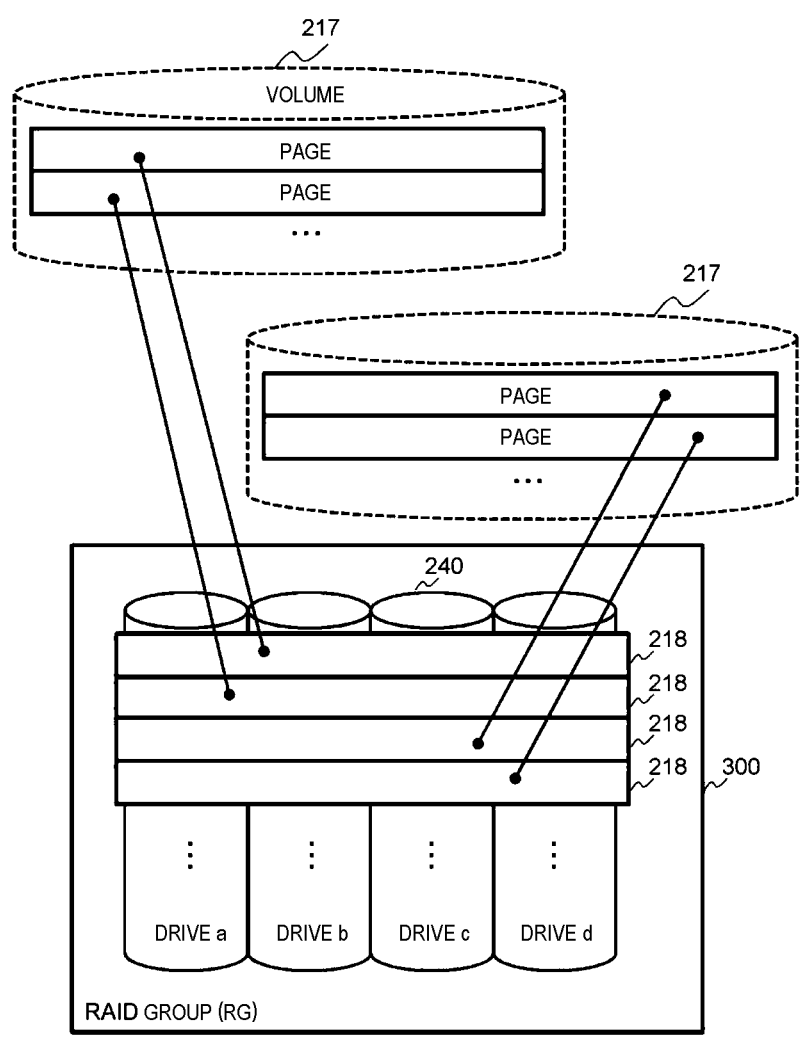
FIG. 2 is a diagram illustrating an example of capacity virtualization.

FIG. 2 is a diagram illustrating an example of capacity virtualization.

A virtualized volume 217 is called a virtual volume 217. Hereinafter, the virtual volume 217 will be simply referred to as the volume 217.

A RAID group (hereinafter sometimes simply referred to as "RG") 300 is a resource having a physical capacity. The capacity of the RG 300 is divided in units of pages 218. One page 218 spans all the flash drives 240 in the RG 300 in order to efficiently utilize the capacity and performance of each of the flash drives 240. The volume 217 is a virtual storage area, and is recognized by the host 100 connected to the storage system 200.

When receiving a write request designating a certain unallocated area (an area to which the page 218 has not been allocated) of the volume 217, the controller 210 allocates the page 218 to the area. The page 218 has not been allocated to the unallocated area of the volume 217, and thus, the storage area of the flash drive 240 is not consumed.

A pool volume constituting the capacity pool may be created based on the RG 300, and the pool volume may be divided into a plurality of pages 218. Since the hierarchy such as the pool volume is provided, only a partial area of the RG 300 can be used as the capacity pool. For example, the RG 300 may be 1 TB, and only 0.5 TB thereof may be used as the capacity pool and the rest may be used for other applications.

A configuration of the flash drive 240 will be described with reference to FIG. 3.

Figure 3:
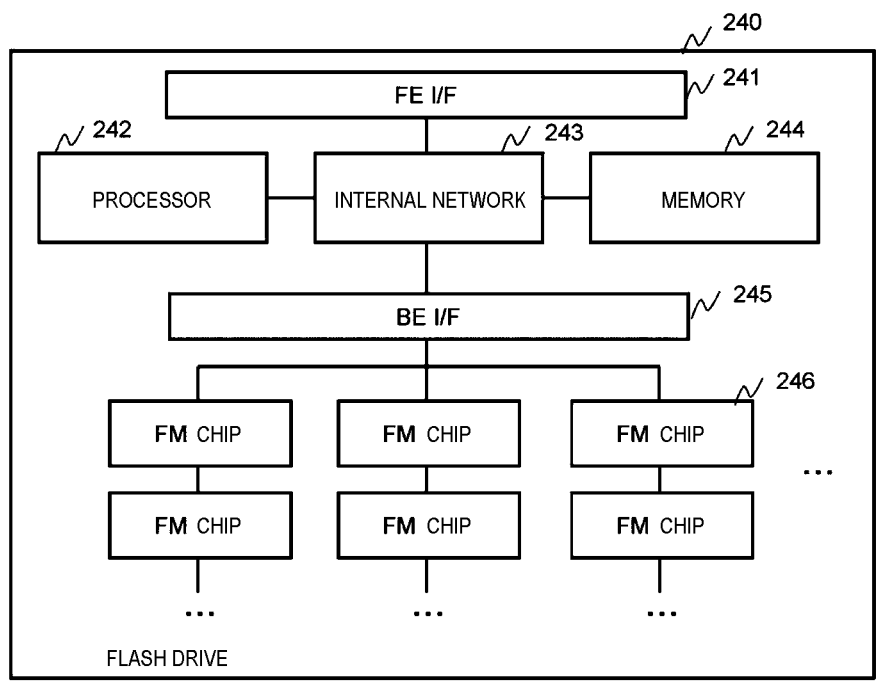
FIG. 3 is a diagram illustrating a configuration of a flash drive.

FIG. 3 is a diagram illustrating the configuration of the flash drive 240.

The flash drive 240 is employed as an example of the physical drive in the present embodiment. The physical drive may be a drive other than the flash drive 240 in the present invention.

The flash drive 240 includes a flash memory and a flash memory (FM) controller that controls input/output with respect to the flash memory.

The flash memory includes a plurality of FM chips 246.

The FM controller includes an FE I/F 241, a processor 242, a memory 244, a BE I/F 245, and an internal network 243 to which these parts are connected. The FM chip 246 is connected to the BE I/F 245. If the FM controller has a data compression/decompression circuit, the circuit may also be connected to the internal network 243.

The FE I/F 241 relays communication with a host device such as the controller 210. The BE I/F 245 relays communication for access to the FM chip 246. The processor 242 receives an I/O request or the like from the host device connected to the FE I/F 241, and executes a process corresponding to the request. The memory 244 stores control information required for the processor 242 to execute various processes and a program to be executed by the processor 242.

The flash drive 240 may be any device as long as the device is constituted by one or more FM chips 246 and the processor 242 that controls the FM chip 246. The flash drive 240 is not limited to a form factor such as a general solid state drive (SSD).

Figure 4:
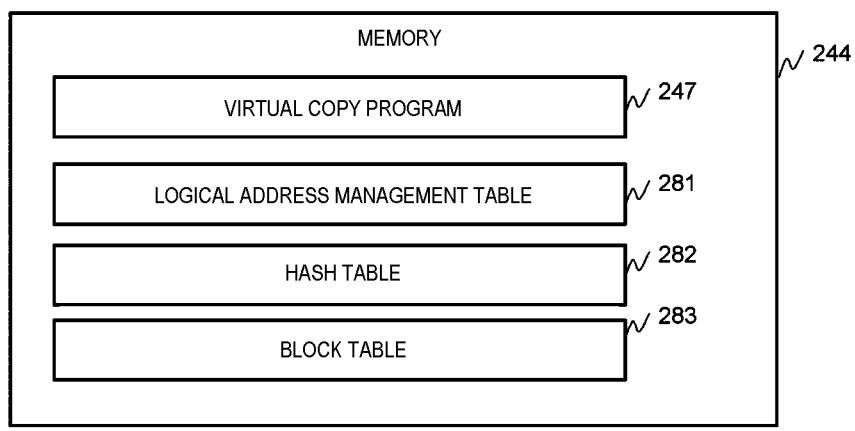
FIG. 4 is a diagram illustrating a program and control information stored in a memory of the flash drive.

FIG. 4 is a diagram illustrating the program and control information stored in the memory 244 of the flash drive 240.

The memory 244 stores a virtual copy program 247, a logical address management table 281, a hash table 282, and a block table 283. Details thereof will be described later. The memory 244 can also store other programs and control information. For example, the memory 244 can store an I/O processing program that controls input/output with respect to the flash memory. FIG. 3 does not illustrate programs and tables which do not directly relate to the present embodiment.

When the flash drive 240 has a compression function and a deduplication functions, the processor 242 may execute processing of compression and deduplication, or a circuit (for example, an application specific integrated circuit (ASIC) or a field-programmable gate array (FPGA)) connected to the internal network 243 may execute a part or the whole of the processing of compression and deduplication.

Figure 5:
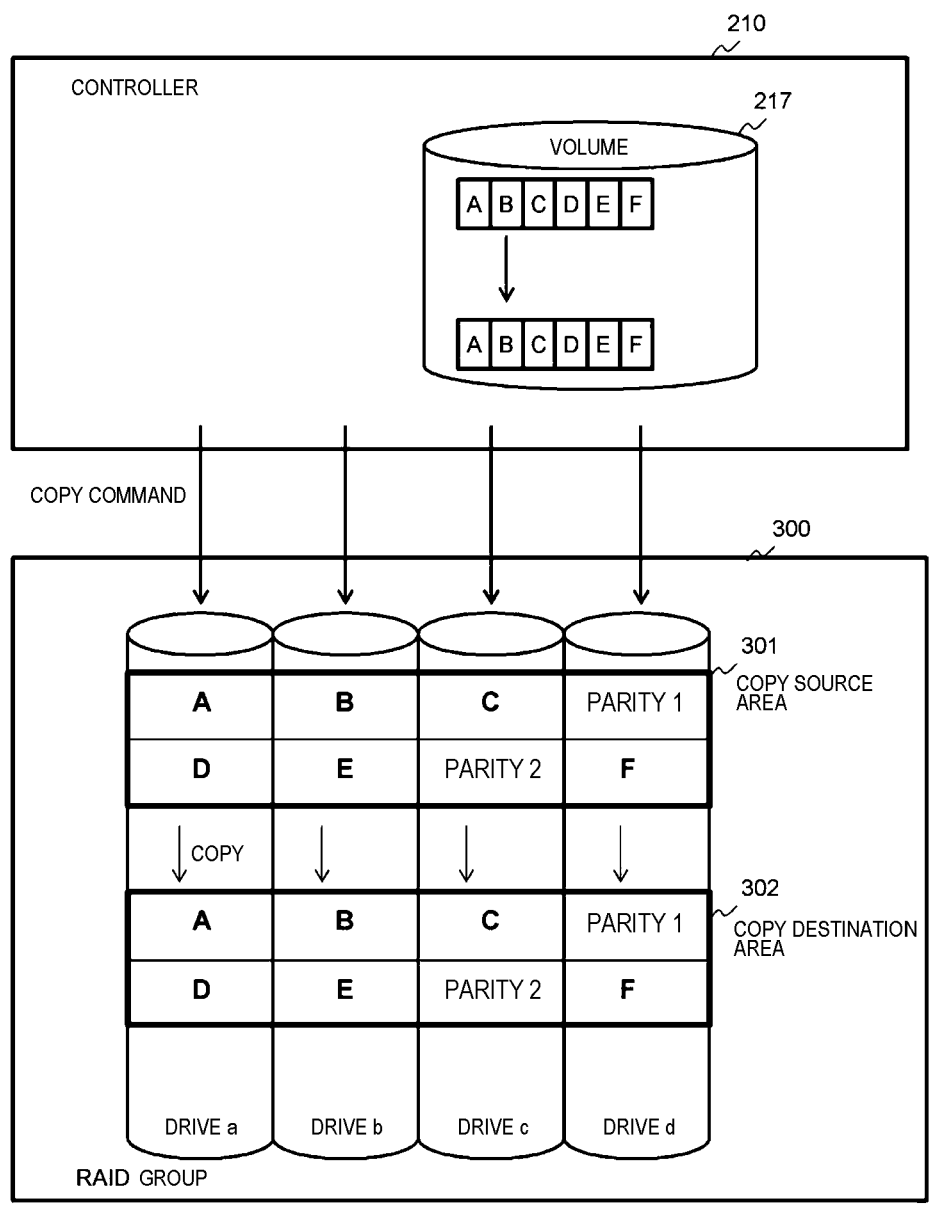
FIG. 5 is a conceptual diagram of offload of deduplication and copy processing to the flash drive.

FIG. 5 is a conceptual diagram of offload of deduplication and copy processing to the flash drive 240. Incidentally, there is a case where "n-th strip" is referred to in the following description (n is a natural number). A value of n is smaller as the strip is located closer to the left and as the strip is located closer to the top. Specifically, for example, when the n-th strip is used as a reference, the (n+1)-th strip is located on the right of the n-th strip (is the head (leftmost) strip of a next stripe if the n-th strip is located at the end (rightmost) of a stripe). In addition, when the n-th strip is used as a reference, the (n−1)-th strip is located on the left of the n-th strip (is the end strip of a previous stripe if the n-th strip is located at the head of a stripe). In addition, in the following description, a logical address belonging to a drive area (logical address space) provided by a flash drive will be sometimes referred to as a "drive address", and a logical address belonging to the volume 217 will be sometimes referred to as a "volume address".

The storage system 200 (controller 210) provides the volume 217. The example of FIG. 5 is an example in which user data sets A, B, C, D, E, and F are copied to another area in the volume 217.

The RG 300 is constituted by four flash drives a, b, c, and d. In the RG 300, each of the user data sets A, B, C, D, E, and F is stored in a strip. Specifically, each of the user data sets A and D is stored in a strip of the flash drive a. Each of the user data sets B and E is stored in a strip of the flash drive b. The user data set C is stored in a strip of the flash drive c. The user data set F is stored in a strip of the flash drive d.

The strip in the flash drive c stores Parity 2 calculated from the user data sets D, E, and F. The strip of the flash drive d stores Parity 1 calculated from the user data sets A, B, and C. Incidentally, an RAID level is RAID5 in this example, but the present invention is applicable to other RAID levels. A copy source area 301 corresponds to two stripes, and is an area in which the user data sets A, B, C, D, E, and F are stored before being copied. A copy destination area 302 is an area of the same capacity as the copy source area 301, is another area in the same RG 300 as the copy source area 301, and is an area which serves as a copy destination of the user data sets A, B, C, D, E, and F.

In the example of FIG. 5, a storage position shift of the copy source area 301 and the copy destination area 302 has not occurred. That is, a flash drive having a head strip of the copy source area 301 is the same as a flash drive having a head strip of the copy destination area 302. Specifically, for example, a copy source strip of the user data set A (the first strip of the copy source area) and a copy destination strip of the user data set A (the first strip of the copy destination area) are located in the flash drive a. Similarly, a copy source strip and a copy destination strip are located in the same flash drive 240 for each of the user data sets B, C, D, E, and F. Thus, the copy processing can be offloaded to the flash drive 240. Further, when the flash drive 240 has the deduplication function, the controller 210 can cause the flash drive 240 to virtually perform copy. That is, the controller 210 can issue a copy command designating copy source and copy destination drive addresses (logical addresses) to the flash drive 240 in order to associate the copy destination drive address as well as the copy source drive address with a physical area storing a user data set. That is only the single user data set A is stored physically due to the deduplication function of the flash drive 240. The same description applies to each of the user data sets B and C.

FIG. 6 is a table illustrating an example of a configuration of the logical address management table 281.

The logical address management table 281 is a table configured to manage which drive address of the flash memory chip 246 an address designated by a host device such as the controller 210 using the flash drive 240 as an access destination drive address and data to be stored in the address are stored. In the present embodiment, a physical data storage position can be searched using the hash table 282 since the deduplication function is provided.

The logical address management table 281 has a record for each logical address (drive address) belonging to a drive area provided by the flash drive 216. Each record stores information such as a logical address 61, a flash page state 62, and a hash value 63. Hereinafter, one logical address ("target logical address" in the description of FIG. 6) will be taken as an example.

The logical address 61 is a target logical address.

The flash page state 62 indicates whether a flash page has been allocated to an area identified based on the target logical address. The flash page state is set to "allocated" with write and set to "unallocated" with an area release command such as unmapping. Incidentally, in the present embodiment, the flash memory is a NAND flash memory and is constituted by a plurality of blocks, and each block is constituted by a plurality of flash pages. Data is read and written in units of flash pages, and data is erased in units of blocks. The FM controller uses the logical address management table 281 and the hash table 282 to manage a correspondence between logical addresses and physical addresses (a block number and a flash page number to be described later in the present embodiment). In the present embodiment, the flash memory is an additionally recordable type. Specifically, when a logical address to which a flash page has been allocated is a write destination, a new free flash page is allocated to the write destination in place of an allocated flash page, and data is written to the newly allocated flash page. For each logical address, data written to the most recently allocated flash page (that is, latest data) is "valid data", a flash page in which the valid data is written is a "valid page", data stored in a flash page allocated in the past is "invalid data", and a flash page in which invalid data is written is an "invalid page". In addition, a flash page capable of newly storing data, which is neither a valid page nor an invalid page, is a "free page".

The hash value 63 indicates a hash value of data stored in an area to be specified by a target logical address. This hash value can be used to search for data that can serve as a deduplication target.

As the hash value 63, a valid value is stored only when the flash page state 62 is "allocated". When the flash page state 62 is "unallocated", "–" indicating invalidity is stored as the hash value 63. This means that a hash value of 8-kilobyte data of Address 0 to 8191 is "AAA" in the example of the drawing. In this example, a flash page size is 8 kilobytes. Incidentally, as a method for searching for duplicate data, another method, for example, a method of storing data itself, may be employed instead of storing the hash value.

FIG. 7 is a table illustrating an example of a configuration of the hash table 282.

The hash table 282 is a table for the deduplication function. Specifically, the hash table 282 manages a state in which one physical address is shared by a plurality of logical addresses (a plurality of drive addresses).

The hash table 282 has a record for each hash value. Each record stores information such as a hash value 71, a block number 72, a flash page number 73, and a sharing count 74. Hereinafter, one hash value ("target hash value" in the description of FIG. 7) will be taken as an example.

The hash value 71 indicates a target hash value.

The block number 72 is a number to uniquely identify a block storing the target hash value. The flash page number 73 is a number to uniquely identify a flash page storing data corresponding to the hash value. That is, the block number and the flash page number correspond to physical addresses.

The sharing count 74 indicates a sharing count, which is the number of logical addresses allocated to the flash page. If the sharing count is "2" or more, duplication is excluded. Incidentally, the flash page to which the logical address is allocated (the flash page storing the target hash value) is a valid page.

FIG. 8 is a table illustrating an example of a configuration of the block table 283.

The block table 283 manages information on a flash page included in a block and a state of the flash page.

The block table 283 has a record for each flash page. Each record stores information such as a block number 81, a flash page number 82, and a state 83. Hereinafter, one flash page ("target flash page" in the description of FIG. 8) will be taken as an example.

The block number 81 is a number to uniquely identify a block (physical block) including the target flash page. The flash page number 82 is a number to uniquely identify the target flash page. The state 83 indicates a state of the target flash page (whether the state is "valid", "invalid" or "free").

How the above-described tables are updated when the flash drive 240 receives a write request from the controller 210 will be briefly described.

The flash drive 240 receives a write request, associated with a logical address (drive address), write data, and a write length, from the controller 210. The processor 242 performs a process to be divided into management units of the flash drive 240. For example, when write data is stored to Logical Addresses 0 to 8192, the processor 242 calculates a hash value of the write data, and updates the hash value 63 of the logical address management table 281. Next, the processor 242 refers to the hash table 282 with the calculated hash value. When there are valid values as the block number 72 and the flash page number 73 corresponding to the calculated hash value, the processor 242 increments the sharing count 74 corresponding to the hash value by one and ends the process. The processor 242 may read stored data and compare the data with the write data to determine whether the both are the same data. When the stored data different from the write data as a result of the comparison, the processor 242 physically stores two pieces of data although the hash value is the same.

On the other hand, when there is no valid value as the block number 72 and the flash page number 73 corresponding to the calculated hash value, the processor 242 searches the block table 283 for a flash page of the state 83 of "free" and stores a block number of a flash page number of the retrieved flash page in the hash table 282 as the block number 72 and the flash page number 73. Then, the processor 242 stores "1" in the sharing count 74 for the hash value. Finally, the processor 242 reports completion and ends the processing.

Next, an operation of the flash drive 240 that has received a copy command from the controller 210 will be described. In the copy command, a copy source drive address and a copy destination drive address are designated.

The processor 242 of the flash drive 240 accesses the logical address management table 281 to acquire a hash value corresponding to the copy source drive address. Next, the processor 242 stores the acquired hash value as the hash value 281 corresponding to the copy destination drive address. Then, the processor 242 accesses the hash table 282 and increments the sharing count corresponding to the acquired hash value by one.

As a result, it is possible to allow the controller 210 to behave as if copy was implemented without actually copying data. This is called "virtual copy" in the present embodiment.

Figure 9:
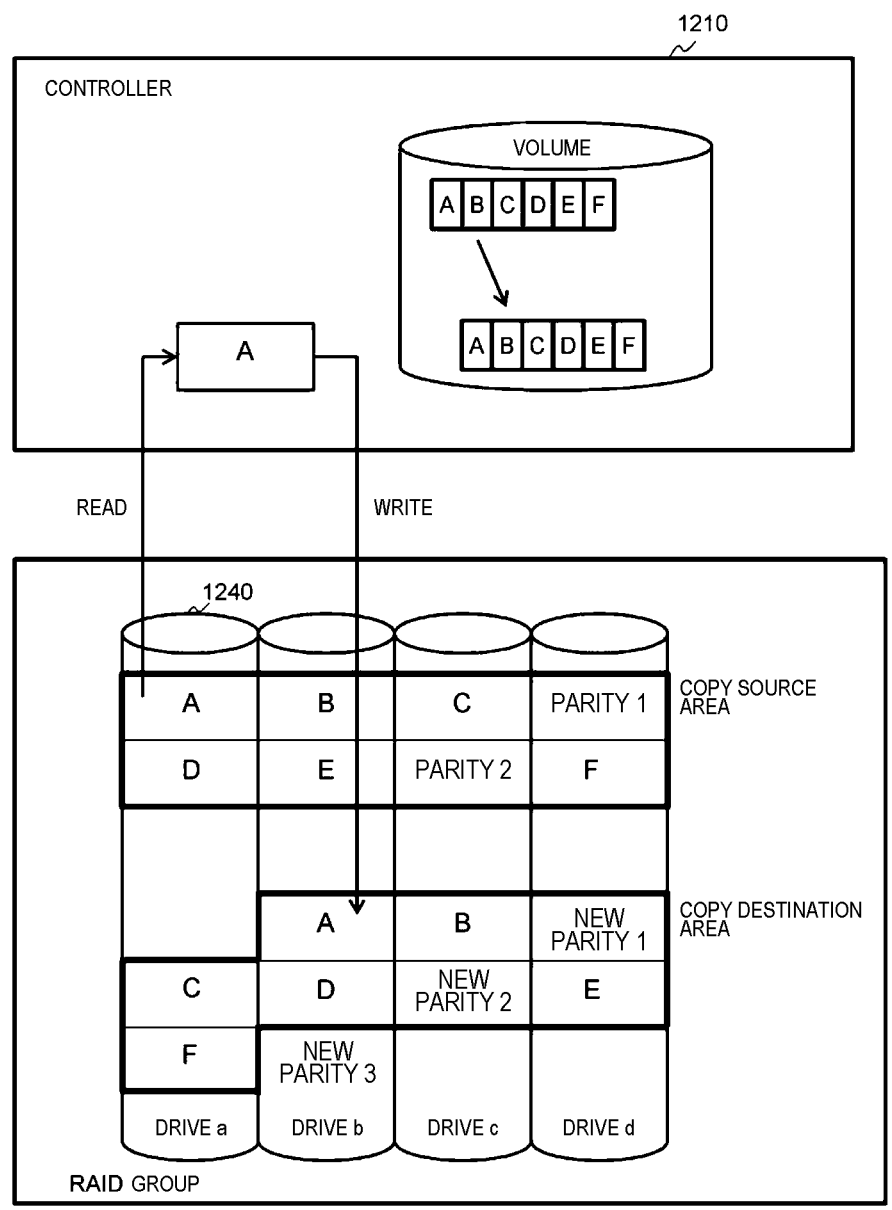
FIG. 9 is a conceptual diagram of a comparative example in which it is difficult to offload deduplication and copy processing to a flash drive because a copy source drive and a copy destination drive are different.

FIG. 9 is a conceptual diagram of a comparative example in which it is difficult to offload deduplication and copy processing to a flash drive because a copy source drive and a copy destination drive are different. Since FIG. 9 is a comparative example of the present embodiment, names of elements in the present embodiment are denoted by different reference signs although being the same.

In this example, a copy destination drive address is shifted by one flash drive from a copy source drive address. For example, when pieces of data from the head to the end of a certain page (page in a capacity pool) are written from a position of the head+256 KB of another page, the shift as illustrated in FIG. 9 occurs.

Since copy source and copy destination flash drives 1240 are different, a controller 1210 reads the user data set A from the flash drive a and writes the read user data set A to the flash drive b. Thus, bandwidths of a BE I/F and a bus of a storage system are consumed.

Further, the user data set A stored in the flash drive a and the flash drive b is not deduplicated, and thus, the amount of consumption of a physical area increases.

A user data set stored in each stripe changes, and a parity value changes. Thus, it is necessary to recalculate a parity and update the parity. For example, in a stripe where the user data sets A and B are stored, it is necessary to recalculate New Parity 1 using the user data sets A and B and a data set stored on the left of the user data set A. It is also necessary to calculate New Parity 2 using the user data sets C, D, and E for the next stripe.

Although only the user data set A is read and written in the example of FIG. 9, it is necessary to read and write each of the user data sets B, C, D, E, and F as well. In this manner, when the copy source drive and the copy destination drive are different, copy occurs for the all user data sets so that the deduplication becomes ineffective.

In the present embodiment, neither performance deterioration nor deterioration of the deduplication effect can be prevented from occurring even if the copy source drive and the copy destination drive are different as described hereinafter. Specifically, in the present embodiment, a positional shift between the copy source drive address and the copy destination drive address is detected, and a user data set is stored by shifting a storage position such that a copy source and a copy destination of the user data set become the same flash drive 240. Hereinafter, shifting and storing the storage position of the user data set will be referred to as "position shift storage" for convenience.

Figure 10:
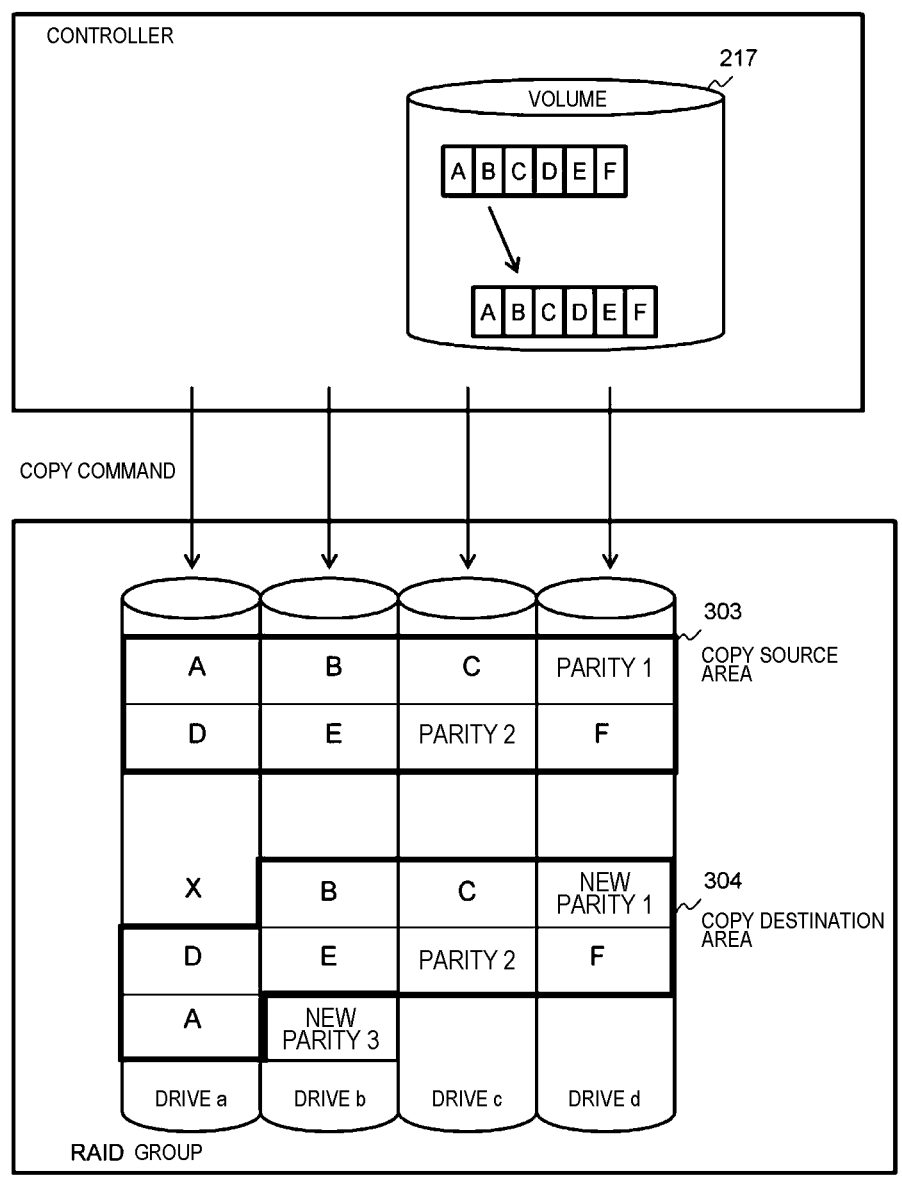
FIG. 10 is a conceptual diagram of position shift storage according to the embodiment.

FIG. 10 is a conceptual diagram of the position shift storage according to the present embodiment. Incidentally, in the following description, a copy destination area 304 is an area (area in an RAID area) according to a copy destination volume address (more precisely, a page address corresponding to the copy destination volume address) and a copy amount (the amount of copy target data). A head strip of the copy destination area 304 is a strip corresponding to a drive and a drive address corresponding to the copy destination volume address. Similarly, a copy source area 303 is an area (area in the RAID area) according to a copy source volume address (more precisely, a page address corresponding to the copy source volume address) and the copy amount. A head strip of the copy source area 303 is a strip corresponding to a drive and a drive address corresponding to the copy source volume address.

In this example, the controller 210 detects that a data storage position (a position of a storage destination strip) is shifted to the right by one flash drive, and performs the position shift storage to store data by shifting the storage position to the left by one flash drive.

Specifically, not the user data set A in the first strip of the copy source area 303 but the user data set B stored in the second strip of the copy source area 303 is stored in the first strip of the copy destination area 304. That is, virtual copy of the user data set B is possible in the drive b. Similarly, not the user data set B in the second strip of the copy source area 303 but the user data set C stored in the third strip of the copy source area 303 is stored in the second strip of the copy destination area 304. That is, the virtual copy of the user data set C is possible in the drive c. In this manner, in the copy destination area 304, the order of the copy destination strip is smaller by one than the order of the copy source strip in the copy source area 303 (that is, the data storage position is shifted to the left by one flash drive). Thus, the user data set A in the first (head) strip of the copy source area 303 is stored in the eighth (end) strip of the copy destination area 304. As a result, the virtual copy of the user data set A is possible in the drive a.

In the example of FIG. 10, a copy source strip and a copy destination strip are located in the same flash drive 240 for each of the data A, B, C, D, E, and F. Thus, copy processing can be offloaded to the flash drive 240 side. Further, it is possible to avoid an increase in the amount of data caused by copy with the deduplication of the flash drive 240.

The parity will be described. The user data sets A, B, and C and Parity 1 in the copy source area 303 are stored in a stripe. Parity 1 is calculated from user data sets A, B, and C.

On the other hand, regarding the copy destination area 304, a user data set X (the user data set X outside the copy destination area 304) on the left of the user data set B, the user data sets B and C, and New Parity 1 are stored in a stripe. Since New Parity 1 is calculated from the user data sets X, B, and C, New Parity 1 has a value different from Parity 1. That is, it is difficult to simply copy Parity 1.

Similarly, it is also necessary to recalculate New Parity 3 in a stripe including an end strip of the copy destination area 304 (the strip in which the user data A is stored). When the copy source area 304 includes a plurality of stripes, it is necessary to recalculate a parity for the head stripe and the end stripe relating to the copy destination area 303. In the example of FIG. 10, it is unnecessary to recalculate a parity for a stripe storing the user data sets D and E, Parity 2, and the user data set F since the combination of user data sets does not change. In other words, the stripe storing the user data sets D and E, Parity 2, and the user data set F is an intermediate stripe relating to the copy destination area 303 (the stripe that does not correspond to either the head stripe or the end stripe), and thus, it is unnecessary to recalculate the parity.

Based on the example of FIG. 10, when a difference (shift) between an in-stripe position (for example, a position from the head of a stripe) of a copy destination head strip (head strip of the copy destination area 304) and an in-stripe position of a copy source head strip (head strip of the copy source area 303) is N bytes (N>0) in a first direction (+ direction or − direction) along the stripe (strip row), the controller 210 shifts storage destination of one or more data sets respectively stored in one or more consecutive strips including the copy source head strip by N bytes from the end of the copy destination area in a second direction (opposite to the first direction). The "+ direction" refers to a right direction (direction in which an address value increases), and the "− direction" refers to a left direction (direction in which the address value decreases). Incidentally, the difference (shift) is not limited to the unit of the strip (a multiple of a strip size). For example, the difference (shift) may be less than the unit of the strip. Specifically, for example, the difference (shift) may be 1 byte when the strip size is 256 KB (kilobyte).

Details will be described hereinafter.

Figure 11:
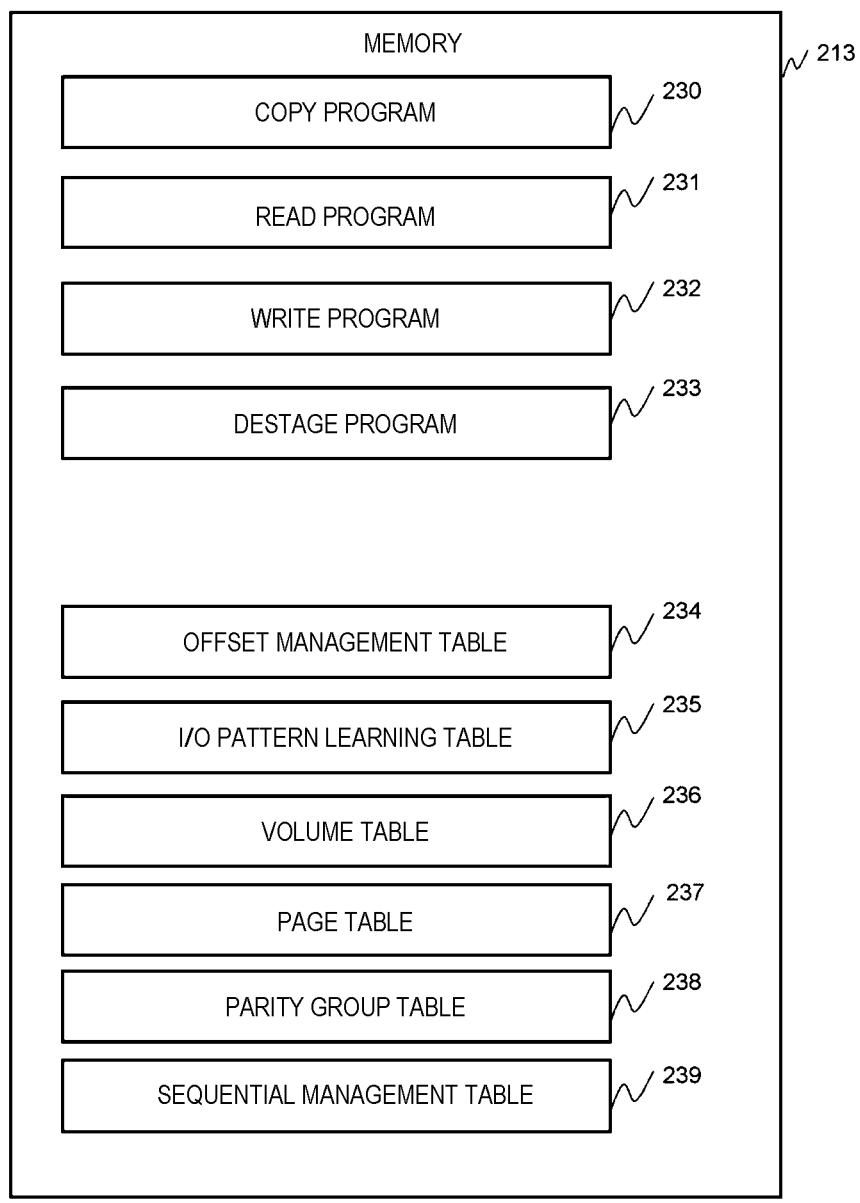
FIG. 11 is a diagram illustrating programs and control information stored in a memory of a controller.

FIG. 11 is a diagram illustrating control information and programs stored in the memory 213 of the controller 210.

In the memory 213, a copy program 230, a read program 231, a write program 232, and a destage program 233 are stored as programs. Although other programs can be also stored in the actual memory 213, FIG. 11 illustrates the programs mainly relating to the present embodiment and does not illustrate the other programs, for example, a monitoring program and the like.

In addition, in the memory 213, an offset management table 234, an I/O pattern learning table 235, a volume table 236, a page table 237, a parity group table 238, and a sequential management table 239 are stored as control information. Although other control information can be also stored in the actual memory 213, FIG. 11 illustrates the control information mainly relating to the present embodiment and does not illustrate the other control information, for example, a cache management table and the like.

Detailed configurations of the volume table 236, the page table 237, and the RG table 238 are not illustrated. The volume table 236 is a table to manage which page 218 is associated with the volume 217 and a volume address. The page table 237 manages a correspondence between a physical area (logical address provided by the drive 240) and the page 218. Further, the page table 237 manages an allocation state of each of the pages 218, the volume 217 serving as an allocation destination, and the like. The parity group table 238 is a table to manage the drives 240 constituting the RG 300, an RAID level of the RG 300, and the like.

Figure 12:
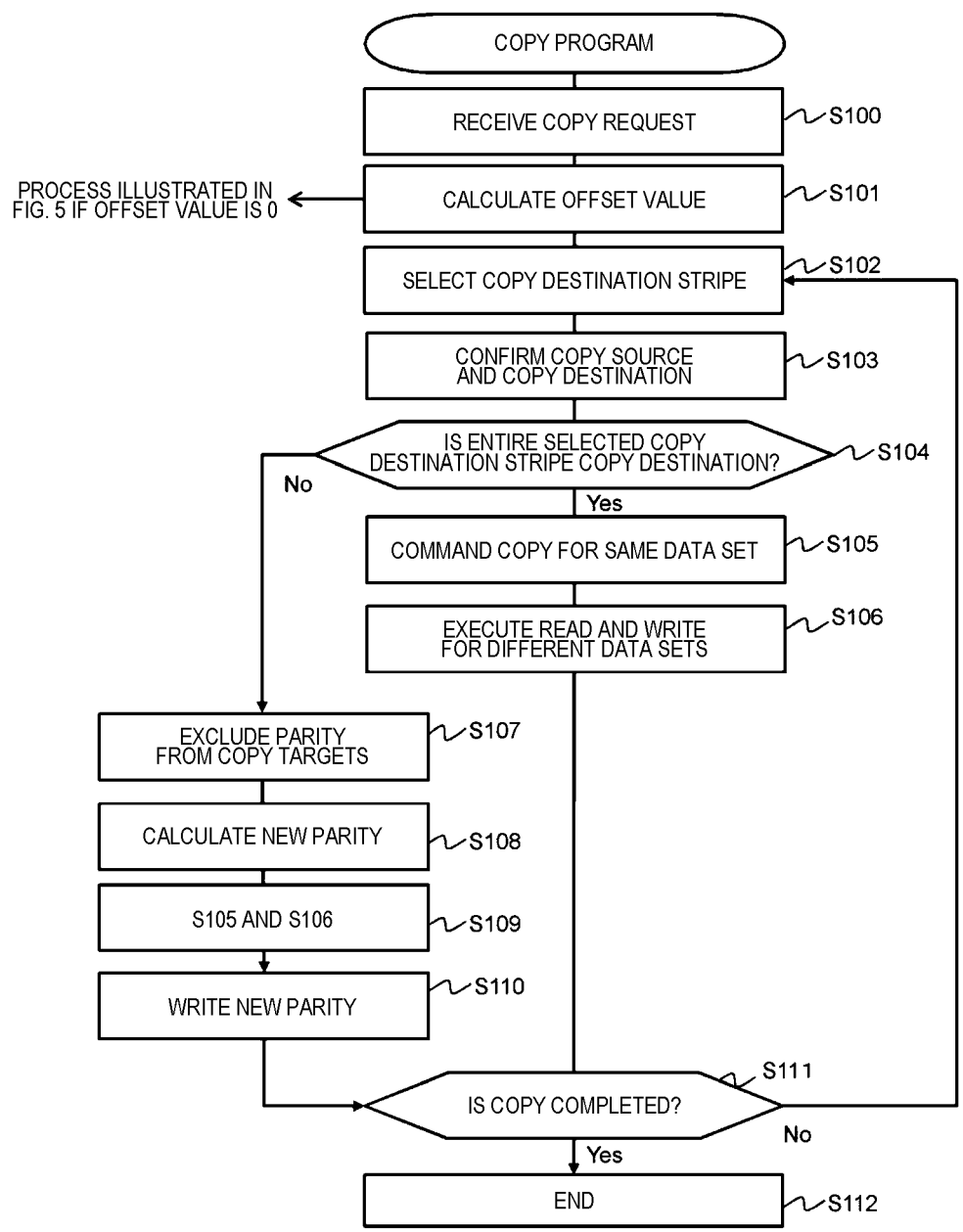
FIG. 12 is a view illustrating an example of processing of a copy program.

FIG. 12 is a view illustrating an example of processing of the copy program 230.

The copy program 230 receives a copy request (S100). The copy request is received from, for example, the host 100 or another program in the storage system 200.

Next, the copy program 230 calculates a difference (hereinafter referred to as an offset value) between a head address of a copy source area and a head address of a copy destination area, and stores the calculated offset value in the offset management table 234. Specifically, for example, the offset value can be calculated by (head address of copy destination area−head address of copy source area) % stripe size. Here, % means a remainder operator. In the present embodiment, the offset value is managed in a unit of the page 218. Details of the offset management table 234 will be described later. In addition, when the offset value=0 (that is, when it is found that there is no storage position shift), the copy program 230 may perform the processing illustrated in FIG. 5, that is, transmit the copy command for virtual copy (the command designating the drive address of the copy source strip and the drive address of the copy destination strip) to each drive.

Next, the copy program 230 selects an unselected stripe from one or more stripes relating to the copy destination area in order to perform processing for each stripe (S102). The stripe selected in S102 is referred to as a "copy destination stripe". As illustrated in FIG. 10, the entire copy destination stripe (all strips) is not limited to the copy destination.

Then, the copy program 230 specifies a copy source stripe of a copy target data set to the determined copy destination stripe (S103). The "copy source stripe" is any strip out of one or more stripes relating to the copy source area. In the present embodiment, the copy program 230 takes into consideration a difference between in-stripe offset values of the copy source and the copy destination, and performs control such that the copy source and copy destination of the same user data set become the same drive. Thus, the copy source drive address indicating the copy source strip is Address+ Offset Value which is a copy source drive address in the related art.

Next, the copy program 230 determines whether the entire selected copy destination stripe is a copy destination (S104). In the example of FIG. 10, when the storage destination stripe of the user data sets B and C are a copy destination stripe, the strip storing the user data X is not the copy destination, and thus, a determination result in S104 is No (false). If the entire copy destination stripe is the copy destination (that is, the copy destination stripe is the intermediate stripe described with reference to FIG. 10), the determination result of S104 is Yes (true).

If the determination result in S104 is Yes, parity calculation is unnecessary since the parity value does not change. That is, the copy program 230 issues a copy command designating the copy source drive address and the copy destination drive address for each drive to the flash drive 240 (S105).

Incidentally, the copy program 230 reads data from a copy source and writes the data to a copy destination regarding the data for which the copy source drive and the copy destination drive are different (S106). A case where a drive with a copy source different from the copy destination in S106 occurs will be described. If the parity position is always the same drive as in RAID4, the copy source and the copy destination always become the same drive by taking into consideration the difference between the in-stripe offset values of the copy source and the copy destination. On the other hand, when the parity position changes for each stripe as in RAID5, an in-stripe position of a parity strip is likely to differ between a copy source stripe and a copy destination stripe, that is, the copy source and copy destination flash drives 240 are likely to change regarding the parity. However, recalculation of a parity is unnecessary since the parity value itself does not change. In such a case, the parity position may be changed, and the controller 210 may store the fact that the parity position has been changed in order to avoid read and write in S106. After S106, the processing proceeds to S111.

If the determination result in S104 is No, the processing proceeds to S107. In S107, the stripe in which the user data sets X, B, and C and New Parity 1 are stored or the stripe in which the user data set A and New Parity 3 are stored is processed in the example of FIG. 10. In this case, the parity calculation process is required since the parity value changes because the entire stripe is not copied.

When a copy target data set is a parity, the copy program 230 does not perform copy (S107). This is because there is no meaning to copy the parity since a value of the parity changes. On the other hand, when the copy target data set is a user data set, the copy program 230 reads an old user data set and an old parity stored in a copy destination stripe and calculates a new parity (S108). In the example of FIG. 10, in the copy processing of the user data set A, the copy program 230 can read a user data set (old user data set) existing in a copy destination strip of the user data set A and a parity (old parity) already existing in a storage destination strip of New Parity 3, and calculate New Parity 3 using the user data set A, the old user data set, and the old parity.

Next, the copy program 230 executes copy of the copy target data set similarly to S105 and S106. In the example of FIG. 10, the copy program 230 copies the user data set A (S105 and S106).

Then, the copy program 230 writes a new parity calculated in S108 in a parity storage position. In the example of FIG. 10, New Parity 3 is written to the flash drive b (the strip next to the end strip of the copy destination area 304) (S110). Thereafter, the processing proceeds to S111.

The copy program 230 determines whether copy has been completed for all stripes relating to the copy destination area (S111). If the determination result in S111 is No, the processing returns to S102. If the determination result in S111 is Yes, the processing ends (S112).

Figure 13:
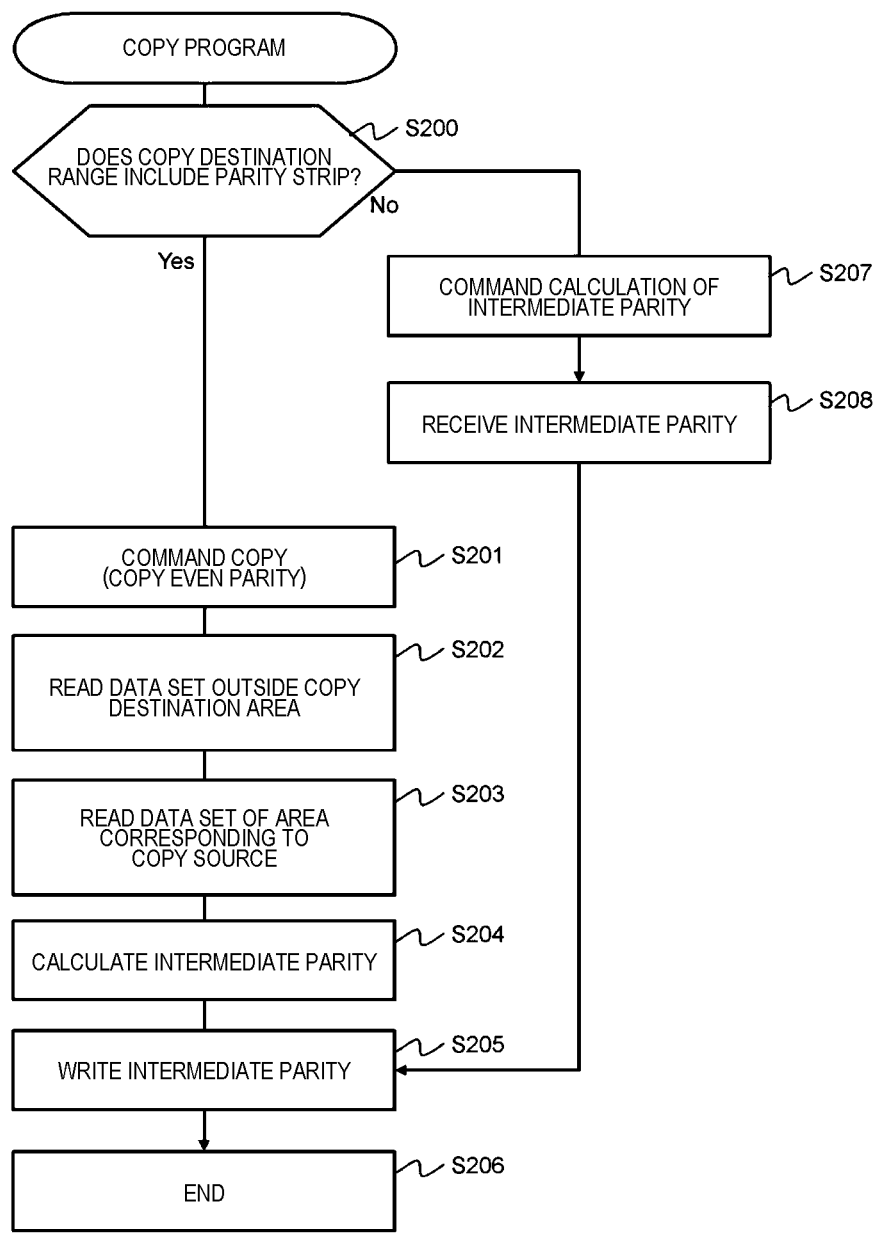
FIG. 13 is a view illustrating an example of processing that replaces S107 to S110.

FIG. 13 illustrates examples of processes that replace S107 to S110. The copy program 230 can perform the processes illustrated in FIG. 13 in place of S107 to S110. That is, the copy program 230 selectively performs the processing illustrated in FIG. 12 (Processing 1 in this paragraph) and the processing obtained by replacing a part of the processing illustrated in FIG. 12 as in FIG. 13 (Processing 2 in this paragraph). That is, a function may be provided to selectively use the function of performing Processing 1 and the function of performing Processing 2. Alternatively, one of the function of performing Processing 1 and the function of performing Processing 2 may be omitted in the present invention.

The copy program 230 determines whether a copy destination range of a copy destination stripe includes a parity strip (S200). In the example of FIG. 10, the copy destination range of the stripe storing the user data sets B and C and New Parity 1 includes the parity strip (that is, the determination result in S200 is Yes). On the other hand, the copy destination range of the stripe storing the user data set A and New Parity 3 does not include the parity strip (that is, the determination result in S200 is No).

If the determination result in S200 is No, the copy program 230 transmits a copy command to the flash drive 240 (S207). This copy command includes a command for calculation of an intermediate parity. The "intermediate parity" is a parity generated based on a value before copy and a value after copy. In the example of FIG. 10, the intermediate parity is calculated by XOR between the user data set A and an old user data set thereof. The copy program 230 writes the intermediate parity to the parity strip (S205), and ends the processing (S206). The flash drive 240 executes the process of generating a new parity from the intermediate parity. For example, the write command for write in S205 may serve as a new parity generation command, or the new parity generation command may be newly issued to the drive 240. Specifically, the drive 240 can calculate the new parity by XOR between the intermediate parity of a write command target and an existing parity (old parity) at a write destination. This will be described later with reference to FIG. 14. With the processing in this manner, the parity calculation can be offloaded to the flash drive 240 so that it is possible to save a calculation resource and a bandwidth of the storage system 200.

When the determination result in S200 is Yes, the copy program 230 transmits the copy command to each of the flash drives 240 relating to the copy destination range (S201). Even if a copy target data set is a parity, copy is performed. Next, the copy program 230 reads a data set from a strip outside the copy destination range (a strip outside the copy destination range) in the copy destination stripe (S202). In the example of FIG. 10, the data set to be read is the user data set X. Subsequently, the copy program 230 reads a data set from a copy source strip (strip in the copy source stripe corresponding to the copy destination stripe) corresponding to the strip outside the copy destination range (S203). Then, the copy program 230 calculates an intermediate parity using the data sets acquired in S202 and S203 (S204). In the example of FIG. 10, the data set read from the copy source strip is the user data set A. A difference between Parity 1 and New Parity 1 in the copy source strip is generated by a difference of whether one user data set is the user data set A or the user data set X. The copy program 230 can calculate XOR between the user data set A and the user data set X and use the obtained value as the intermediate parity. Finally, the copy program 230 writes the intermediate parity to the parity strip (S205), and ends the processing (S206). In the write command (intermediate parity write command) in S205 herein, a copy destination drive address designated in the copy command transmitted in S201 is designated. This aims to enable the drive 240 to generate a new parity with an old parity (virtually copied old parity) associated with the copy destination drive address in S201 and the intermediate parity to be written.

When the copy destination range exceeds half in the copy destination stripe, the number of times of access to the flash drive 240 is smaller in S201 to S205 than that in S107 to S110. Conversely, when the copy destination range is less than half in the copy destination stripe, the number of accesses with respect to the flash drive 240 is smaller in S107 to S110 than that in S201 to S205. Accordingly, the copy program 230 may select Processing 1 (FIG. 12) when the copy destination range exceeds half of the copy destination stripe, and select Processing 2 (a part of the processing of FIG. 12 is replaced by the processes of FIG. 13) when the copy destination range is less than half of the copy destination stripe (either Processing 1 or Processing 2 may be selected when the copy destination range is half of the copy destination stripe).

Figure 14:
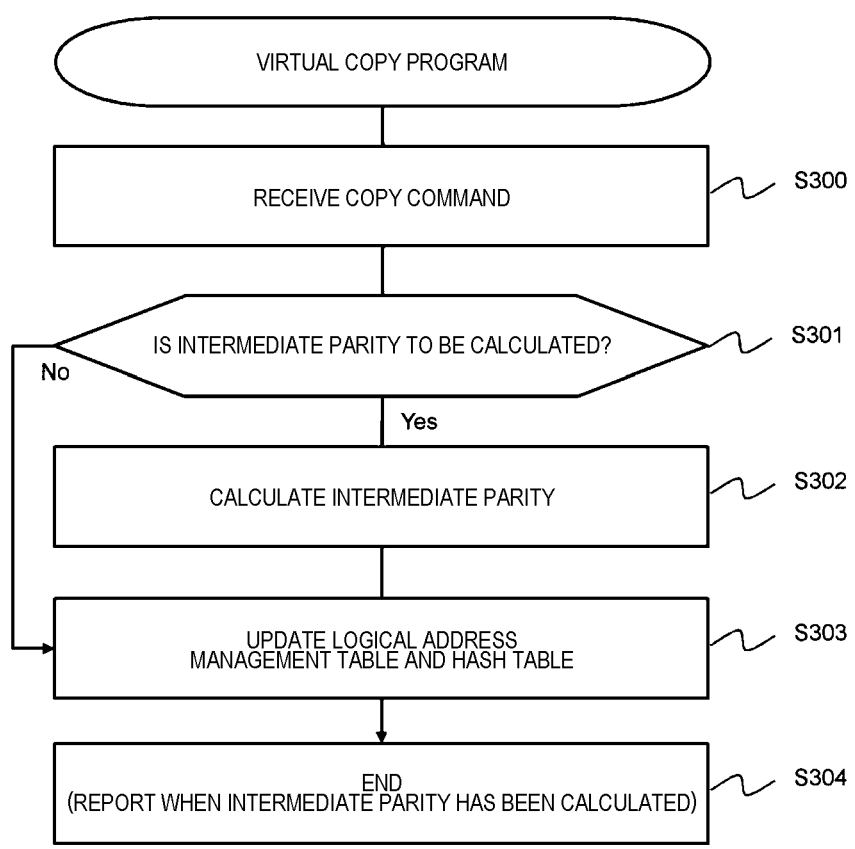
FIG. 14 is a view illustrating another example of processing of a virtual copy program.

FIG. 14 is a view illustrating an example of processing of the virtual copy program 247.

The virtual copy program 247 receives a copy command, and allocates a physical address allocated to a copy source drive address to a copy destination drive address. That is, the virtual copy program 247 performs virtual copy to behave as if copy was performed by updating control information. Specifically, the virtual copy is performed as follows.

The virtual copy program 247 receives the copy command (S300). In this copy command, the copy source drive address, the copy destination drive address, and a data length are designated as parameters.

As described in FIG. 13, there is a case where the flash drive 240 calculates the intermediate parity. Thus, the virtual copy program 247 determines whether it is necessary to calculate the intermediate parity (S301). If the determination result in S301 is Yes, the virtual copy program 247 calculates XOR between an old user data set at a copy destination and a user data set to be copied as the intermediate parity (S302).

Next, the virtual copy program 247 updates the logical address management table 281 and the hash table 282 (S303). Specifically, the virtual copy program 247 acquires the hash value 63 corresponding to the copy source drive address, and stores the acquired hash value as the hash value 63 corresponding to the copy destination drive address. In addition, the virtual copy program 247 increments the sharing count 74 corresponding to the acquired hash value by one. With the above-described update of the tables, the copy source drive address and the copy destination drive address have structures pointing to the same physical address. That is, copy source data and copy destination data are deduplicated. The sharing count 74 is used to determine whether there is no logical address to be referred to and data may be physically deleted when deleting data.

Finally, the virtual copy program 247 reports the completion of processing (S304). Incidentally, if the intermediate parity is calculated in S302, the virtual copy program 247 reports the completion report and the intermediate parity.

FIG. 15 is a table illustrating an example of a configuration of the offset management table 234.

This table 234 manages, in units of pages, how much a storage position of data is shifted.

The offset management table 234 has a record for each page 218. Each record stores information such as a page number 1501, an offset management flag 1502, an offset value 1503, a start position 1504, and an end position 1505. Hereinafter, one page 218 ("target page 218" in the description of FIG. 15) is taken as an example.

The page number 1501 is a number to uniquely identify the target page 218.

The offset management flag 1502 is a flag indicating whether a storage position of data of the target page 218 is shifted. "ON" means that there is a shift. "OFF" means that there is no shift.

The offset value 1503 is managed only when the offset management flag 1502 corresponding to the target page 218 is "ON". The offset value 1503 manages how much the storage position of data in the target page 218 is shifted.

The start position 1504 and the end position 1505 indicate a start drive address and an end drive address of an area in which the storage position is shifted.

In the example of FIG. 15, the offset value in the page 218 is managed. For example, "256 KB" of the start position 1504 means that a storage position after 256 KB in the page 218 is shifted. "-" of the start position 1504 means the head of the page 218, and "-" of the end position 1505 means the end of the page 218.

A specific example will be described.

FIG. 16 is a schematic view of a first specific example according to the offset management table 234 of FIG. 15.

In this example, a size of one data set is 256 KB. The head of a copy destination area a is a position of 256 KB from the head of Page 0. The end of the copy destination area a is a position of 256 KB from the head of Page 2. Data sets to be copied are the data sets A, B, C, D, and so on from the head. No parity is included in the example for the sake of simplification. The data sets are stored in the order of the data sets B, C, and D from the position of 256 KB of Page 0, and the data set A is stored at the end. That is, an offset value is +256 KB.

According to the offset management table 234, Pages 0, 1, and 2 manage the above state. The offset value of Pages 0, 1, and 2 is +256 KB. A start position of Page 0 is 256 KB, and an end position of Page 2 is 256 KB. Other start positions and end positions are "–", which indicate the state of being included in the copy destination.

FIG. 17 is a schematic view of a second specific example according to the offset management table 234 of FIG. 15.

In this specific example, a size of one data size is the same. In this example, there are data A, B, C, D, and so on (different from those of the first specific example) as data sets to be copied to the copy destination area a. Then, there are data sets A', B', C', D', and so on as data sets to be copied to a copy destination area b. The head of the copy destination area a is a position of 256 KB from the head of Page 10. The end of the copy destination area a is a position of 256 KB from the head of Page 12.

The head of the copy destination b is a position of 256 KB from the head of Page 11. The end of the copy destination area b is a position of 512 KB from the head of Page 13. An offset value of the copy destination area a is +256 KB, and an offset value of the copy destination area b is +512 KB. That is, the copy destination area a and the copy destination area b are mixed in Page 12, and the offset values thereof are different.

Page 12 of the offset management table 234 manages the above state. Page 12 is associated with two records. A first record is the offset value of +256 KB and the end position of 256 KB. A second record is the offset value of +512 KB and the start position of 256 KB.

The offset management table 234 may be implemented so as to be capable of corresponding to a plurality of copy destination areas, or configured to be capable of managing a fixed number of copy destination areas.

Figure 18:
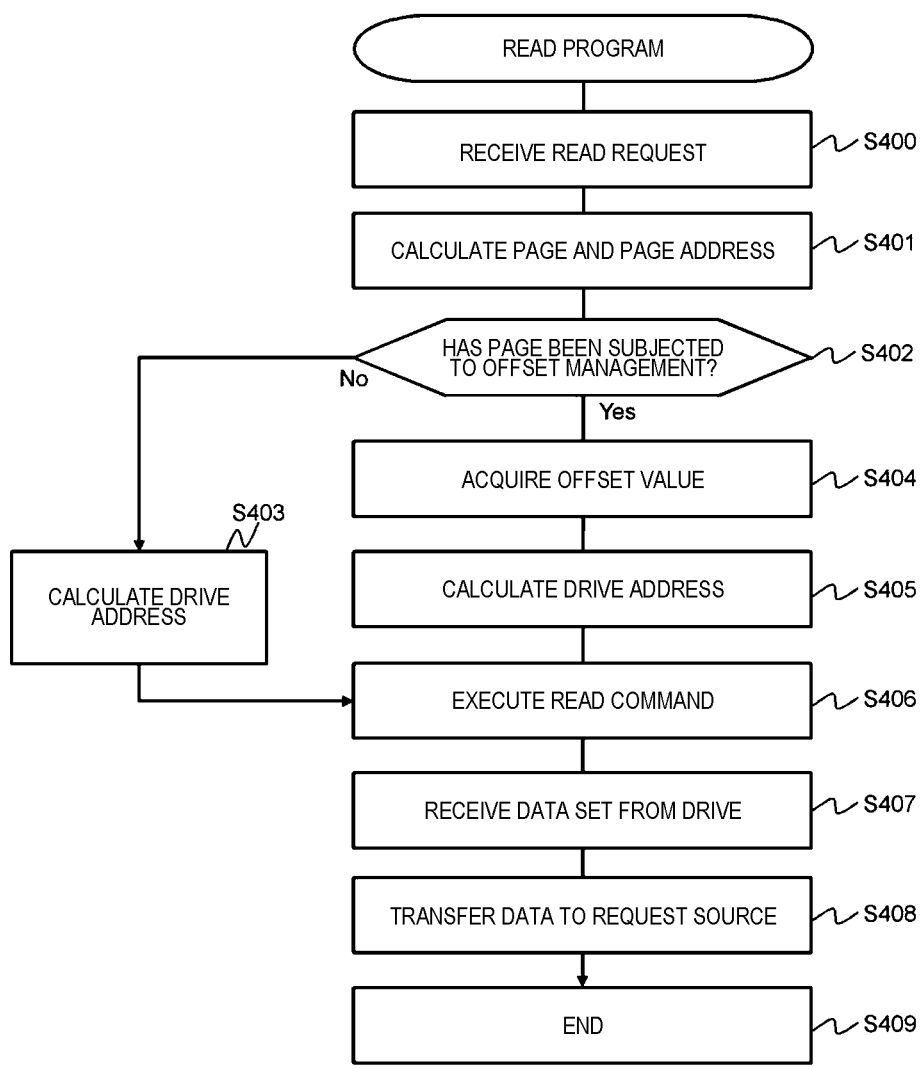
FIG. 18 is a view illustrating an example of processing of a read program.

FIG. 18 is a view illustrating an example of processing of the read program 231.

The read program 231 is a program to receive a read request from the host 100, read data from the flash drive 240, and transmit the data to the host 100.

The read program 231 receives the read request (S400), and calculates a page storing read target data and a page address (logical address belonging to the page) (S401).

Next, the read program 231 refers to the offset management table 234 to determine whether the page calculated in S401 has been subjected to offset management (whether the offset management flag 1502 corresponding to the calculated page is "ON") (S402).

If a determination result in S402 is No, the read program 231 calculates the flash drive 240 and a drive address from the page 218 and the page address calculated in S401 (S403). Thereafter, the processing proceeds to S406.

If the determination result in S402 is Yes, the read program 231 acquires the offset value 1503 corresponding to the page 218 calculated in S401 (S404). Then, the read program 231 calculates the drive address of the flash drive 240 in which a data set is stored based on the acquired offset value (S405). Specifically, first, the read program 231 calculates the page address of the page 218 by (page address calculated in S401)–(offset value acquired in S403). Next, the read program 231 calculates the flash drive 240 corresponding to the calculated page address and the drive address in the flash drive 240. There is a case where a result of (page address calculated in S401)–(the offset value acquired in S403) exceeds a start position of the calculated page. In such a case, the read program 231 uses an address calculated by subtracting the excess amount from an end position of the calculated page as the page address. In the example of FIG. 17, a calculated address of the data set A exceeds a start position. If the result of (page address calculated in S401)–(offset value acquired in S403) exceeds the end position 1505 of the calculated page, the read program 231 conversely calculates the page address by adding the excess amount to the start position of the calculated page.

Next, the read program 231 issues a read command to the flash drive 240 according to the calculated address (S406), and receives data from the flash drive 240 (S407). Finally, the read program 231 transfers the read data to the host 100 (S408), and ends the processing (S409).

The data read from the flash drive 240 may be stored in a cache area (an area in a cache memory). In such a case, a cache hit (presence of read target data in the cache area) is obtained in subsequent read processing to access the same area, and the drive access is unnecessary, and thus, the read processing can be speeded up. After S407, data can be stored in the cache area. When cache data is managed with an address of the volume 217, it is possible to check whether there is a cache hit immediately after S400.

As described above, correct data can be read even when data is shifted and stored.

Figure 19:
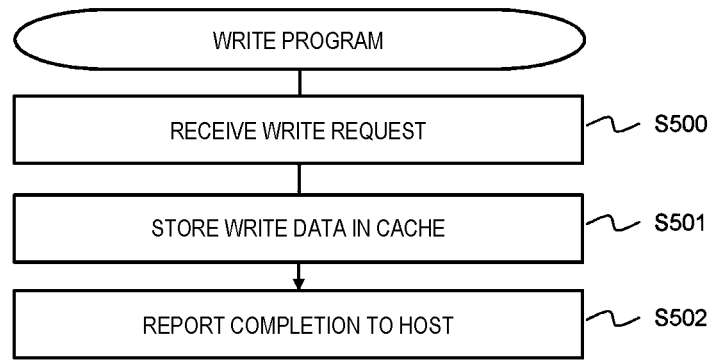
FIG. 19 is a view illustrating an example of processing of a write program.

FIG. 19 is a view illustrating an example of processing of the write program 232.

The write program 232 is a program to receive a write request from the host 100 and store write data in a cache.

The write program 232 receives the write request (S500). Next, the write program 232 secures a cache area configured to store the write data, and stores the write data in the cache area (S501). Finally, the write program 232 reports completion to the host 100 (S502). Incidentally, when the page 218 is not allocated to a write destination area in the volume 217, the data is stored in the page 218 after allocating the page.

Figure 20:
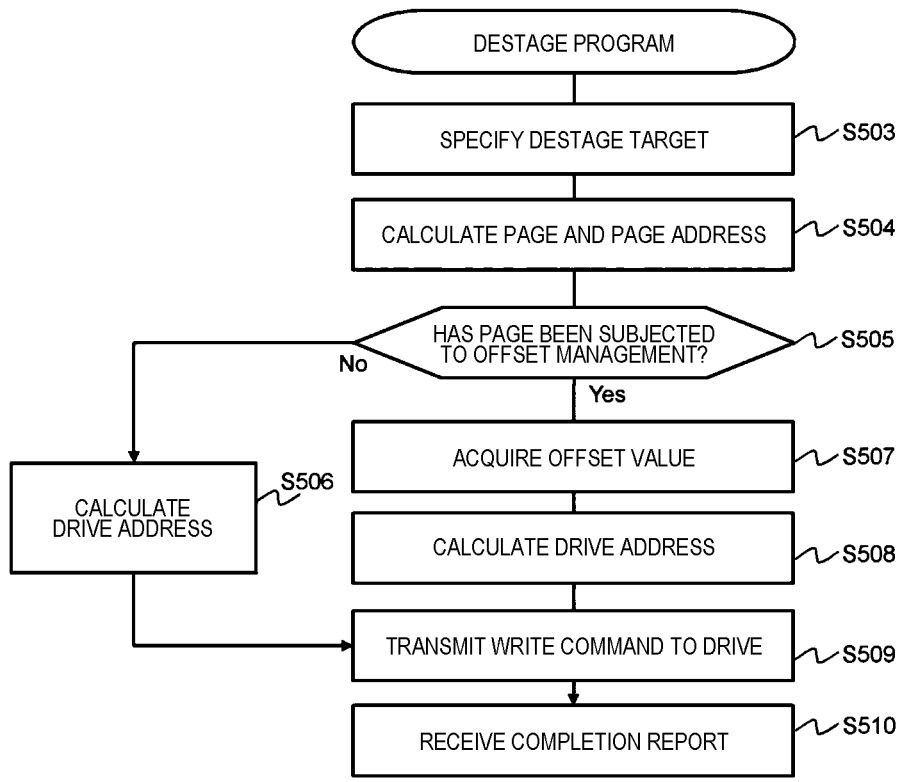
FIG. 20 is a view illustrating an example of processing of a destage program.

FIG. 20 is a view illustrating an example of processing of the destage program 233.

The destage program 233 writes data (dirty data) that has not been written to the flash drive 240 from a cache area to the flash drive 240. The processing of the destage program 233 is periodically executed or executed based on a use rate of a cache memory, the amount of dirty data, or the like. Details thereof will be described hereinafter.

The destage program 233 determines destage target data (S503). This is realized by searching for dirty data in a cache memory. Next, the destage program 233 calculates the page 218 where the destage target data is stored and a page address (S501).

The destage program 233 determines whether the calculated page has been subjected to offset management (S505).

If a determination result in S505 is No, the destage program 233 calculates the flash drive 240 and a drive address based on the page 218 and the page address (S506). Thereafter, the processing proceeds to S509.

If the determination result in S505 is Yes, the destage program 233 acquires the offset value 1503 corresponding to the calculated page 218 (S507). Then, the destage program 233 calculates the flash drive 240 as a destage target and a drive address of the flash drive 240 based on the acquired offset value (S508). If the calculated drive address exceeds the start position 1504 or the end position 1505 corresponding to the page, an address is calculated similarly to the read program 231.

Next, the destage program 233 issues a write command to the flash drive 240 according to the calculated drive address and waits for a completion report (S509).

Finally, the destage program 233 receives the completion report and ends the processing (S510).

As described above, it is possible to write a data set to a strip according to the correct drive address even if the data set is shifted and stored.

The case where the storage system 200 receives a copy request has been described in the above description. In the copy request, a fact that the request relates to copy, a copy source volume address, a copy destination volume address, and a copy amount (size of copy target data) are designated.

On the other hand, there is a possibility that the host 100 reads data and the host 100 copies the read data to copy the data. In such a case, the controller 210 receives a read request and a write request instead of the copy request. Further, in general, copy is performed by making a read request and a write request of 256 KB a plurality of times. In the present embodiment, the copy processing and deduplication processing can be offloaded to the flash drive 240 even in such a case. That is, a sequential read range (for example, a head volume address of a range of sequential read and the total amount of sequentially read data) may correspond to a range according to the copy source volume address and the copy amount, and a copy source area (for example, the copy source area 303 in FIG. 10) in an RAID area may be specified from the sequential read range. In addition, a sequential write range (for example, a head volume address of a range of sequential write and the total amount of sequentially written data) may correspond to a range according to the copy destination volume address and the copy amount, and a copy destination area (for example, the copy destination area 304 in FIG. 10) in an RAID area may be specified from the sequential write range.

Details will be described hereinafter.

FIG. 21 is a table illustrating an example of a configuration of the I/O pattern learning table 235.

There is a high possibility that data copy becomes a sequential access due to a read request and a write request from the host 100. The present table 235 is a table configured to record an I/O pattern and determine whether an access is a sequential access or a random access.

The I/O pattern learning table 235 has a record for each host access (access from the host 100). Each record stores information such as a volume number 2101, time 2102, a type 2102 2103, an access address 2104, and an access length 2105. Hereinafter, one host access ("target host access" in the description of FIG. 21) will be taken as an example.

The volume number 2101 is an identifier configured to uniquely identify the volume 217 of an access destination according to the target host access. The time 2102 indicates the time when the target host access (a write request or a read request) has been received. The type 2103 indicates a type of the target host access (read or write). The access address 2104 is an access destination address (volume address) according to the target host access. The access length 2105 indicates a size of I/O target data according to the target host access.

For example, the head record in FIG. 21 means that a read request to read 256 KB from Address 0 has been received for Volume 0 at 9:00. Although this table 235 manages the read request and the write request in one table, the read request and the write request may be managed in different tables.

FIG. 22 is a table illustrating an example of a configuration of the sequential management table 239.

This table 239 manages a volume address of a sequential access and a hash value of access target data. As a result, it is possible to determine whether it is the copy processing based on the identity of data between a read request and a write request issued by the host 100.

The sequential management table 239 has a record for each access address. Each record stores information such as a sequential ID 2101, a volume number 2102, an access address 2103, and a hash value 2104. Hereinafter, one access address ("target access address" in the description of FIG. 22) will be taken as an example.

The sequential ID 2101 is an ID configured to identify a sequential access of which access destination is the target access address (volume address). This can be distinguished, for example, when one volume similarly receives a plurality of sequential accesses.

The volume number 2102 is a number configured to uniquely identify a volume to which the target access address belongs.

The access address 2103 indicates the target access address.

The hash value 2104 indicates a hash value of data stored in the target access address.

Figure 23:
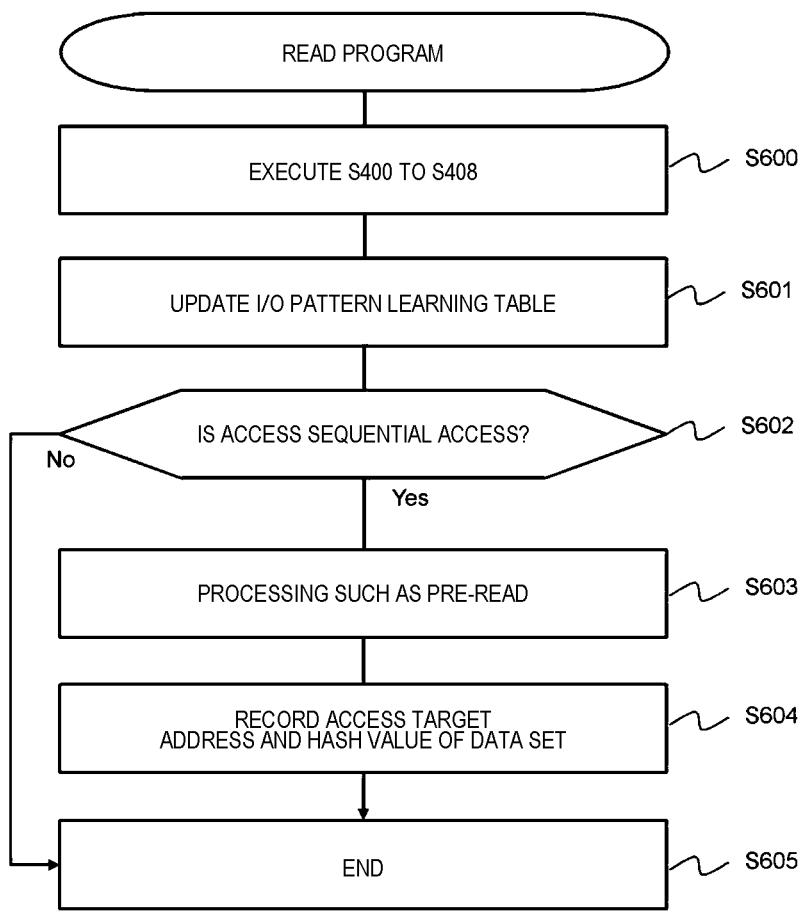
FIG. 23 is a view illustrating another example of processing of a read program 231.

FIG. 23 is a view illustrating another example of the processing of the read program 231.

The read program 231 can perform Processing 3 (processing illustrated in FIG. 23) in place of or in addition to at least one of Processing 1 (processing illustrated in FIG. 12) and Processing 2 (obtained by replacing a part of the processing illustrated in FIG. 12 with the processing illustrated in FIG. 13).

First, the read program 231 executes S400 to S408 illustrated in FIG. 17 (S600).

Next, the read program 231 causes adds the volume number 2101, the time 2102, the type 2103 of "read", the access address 2104, and the access length 2105 to the I/O pattern learning table 235 for a read source address (an address designated in a read request) (S601).

Subsequently, the read program 231 determines whether a read source volume (a volume designated in the read request) is sequentially accessed (S602). Specifically, for example, the read program 231 refers to the I/O pattern learning table 235 to determine whether consecutive accesses are issued to consecutive addresses based on two or more records (the access address 2104 and the access length 2105) corresponding to the read source volume. When a result of (certain access address 2104)+(access length 2105 corresponding to certain access address 2104) is an access address 2104 of time 2102 next to the time 2102 corresponding to the certain access address 2104, the read program 231 determines that the access is the sequential access. That is, the read program 231 may determine that the access is the sequential access when addresses of K accesses (K is an integer of two or more) are continuous.

If a determination result in S602 is No, the processing ends (S605).

If the determination result in S602 is Yes, the read program 231 performs a process for the sequential access (S603). For example, the read program 231 performs the process including reading data from a drive to a cache area in advance in order to speed up the next access.

Then, the read program 231 stores the access address 2203 and the hash value 2204 of the data in the sequential management table 239 (S604). These are used to determine the identity of data when a write request is made. After S604, the processing ends (S605).

Next, a description will be given regarding processing to receive a write request from the host 100, to make a determination as copy processing, and to offload the copy processing and deduplication to the flash drive 240.

Figure 24:
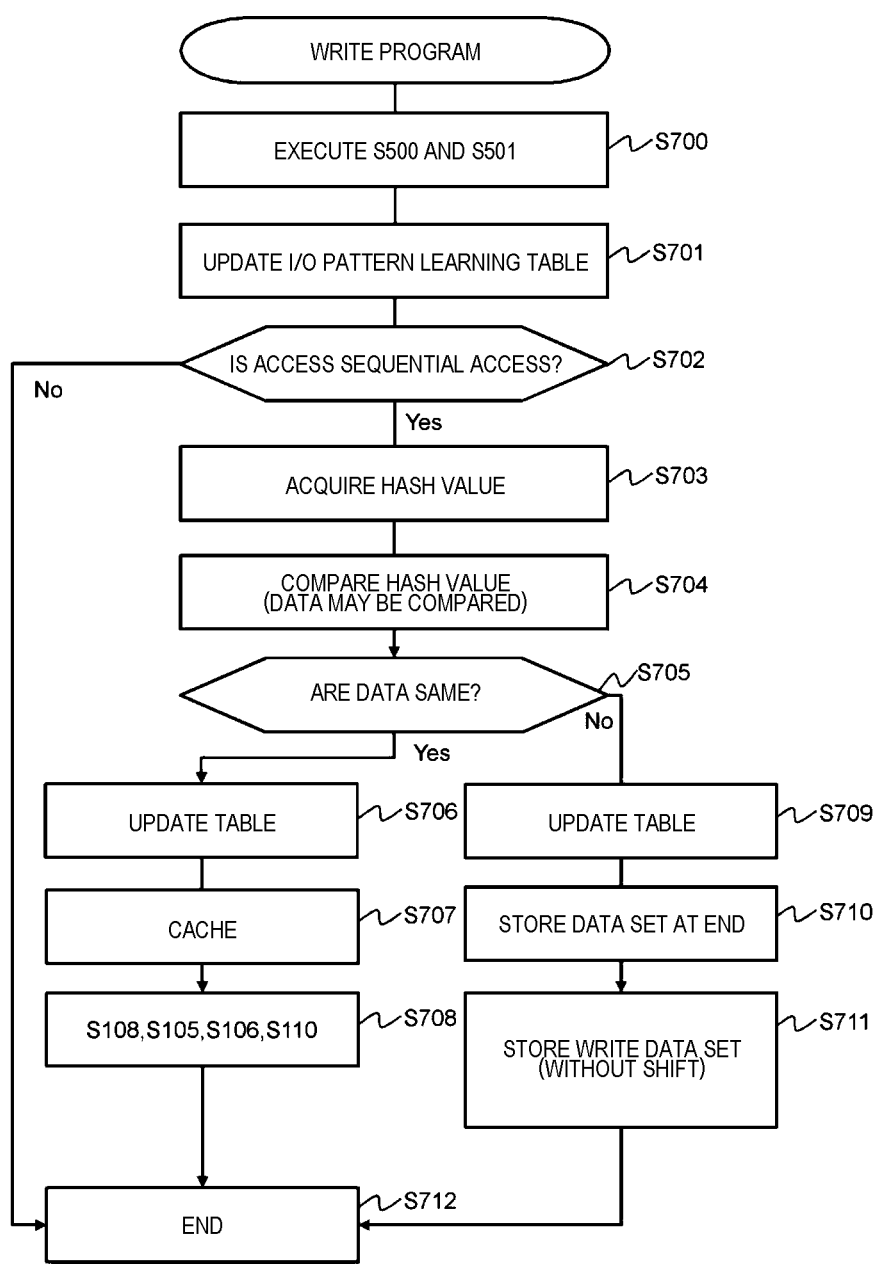
FIG. 24 is a view illustrating another example of processing of a write program 232.

FIG. 24 is a view illustrating another example of the processing of the write program 232.

The write program 232 can execute Processing Q (processing illustrated in FIG. 24) in place of or in addition to Processing P (processing illustrated in FIG. 19).

First, the write program 232 executes S500 to S501 illustrated in FIG. 19 (S700).

Next, the write program 232 updates the I/O pattern learning table 235 based on a received write request in the same manner as the read program 231 (S701). The write program 232 is different from the read program 231 in terms that the "type" 2103 stores "write" instead of "read".

Subsequently, the write program 232 refers to the I/O pattern learning table 235 to determine whether a write destination volume (a volume designated by the write request) is sequentially accessed (S702).

If a determination result in S702 is No, the processing ends (S708).

If the determination result in S702 is Yes, the write program 232 refers to the sequential management table 239 to search for a copy source. Specifically, the write program 232 refers to the sequential management table 239 to acquire two or more hash values 2204 respectively corresponding to two or more access addresses belonging to each sequential access (S703). When a plurality of sequential accesses are managed, all the sequential accesses are set as targets since it is not known which of the sequential accesses corresponds.

Then, the write program 232 compares a hash value of write data with the hash value acquired in S703 (S704). It is unclear which data according to the write request received by the write program 232 corresponds to data of which order of sequential read. Thus, the write program 232 compares the hash value of the write data with all hash values of one sequential access, for example, until a matching hash value is found (for example, the hash value of the write data is compared with all the hash values ABC, DEF, ..., GHI, JKL, and so on in FIG. 22 until the values match). The write program 232 may perform not only the comparison of the hash values but also comparison of data (comparison of write data and data that belongs to sequential read).

If it is possible to determine that pieces of data are the same as a result of the comparison (S705: Yes), the write program 232 executes S706 to S708 and S712.

If a write target address (address designated in the write request) is not managed by the offset management table 234 in S706, the write program 232 updates the offset management table 234. Specifically, the write program 232 stores a page number of a page to which the write target address belongs as the page number 1501, and sets the offset management flag 1502 corresponding to the page to "ON". The write program 232 calculates an offset value corresponding to the page using the write target address and the access address 2103 corresponding to the hash value of the write data, and stores the calculated offset value 1503. The write program 232 stores a position to which data is to be shifted and stored as the start position 1504 corresponding to the page. When data is shifted and stored from the storage of the write data received in S700, the start position 1504 is the write address.

After the update of the offset management table 234, the write program 232 temporarily stores a write data set in a cache area when a write destination of the write data set is the end of a write area as a result of shifting and storing the write data set in S707. Specifically, the storage position of the write data set A is not defined in the example of FIG. 10. This is because a range for the storage in the shifted manner is not defined up to the data set F at a point in time when the write of the data set A is received.

On the other hand, the write program 232 executes S108, S105, S106, and S110 to shift and store a data set in the case of other data. In the example of FIG. 10, when the data set is the data sets B and C, a storage position of the data set is defined at a point in time when the write request is received, and thus, the data set can be stored in S708.

With the execution of S708, the storage of the data set is completed on the flash drive 240. Thus, the write program 232 may discard the data set stored in the cache area in S501 or does not necessarily execute S501.

If it is difficult to determine that the pieces of data are the same as a result of the comparison in S704 (S705: No), the write program 232 executes S709 to S712.

In S709, the write program 232 updates the offset management table 234 (S709). Specifically, the write program 232 stores an address of a previous write request as the end position 1505. That is, the write program 232 stores the last address of sequential write as the end position 1505. The write program 232 records a write target address as the access address 2304 for the write request that is determined to be the sequential write, and thus, can acquire the address of the previous write request.

Next, the write program 232 stores a data set stored at the end of the write area (S710). Specifically, the data set is the above-described data set A.

Subsequently, the write program 232 stores data (data corresponding to the determination result No in S705) that has been received in a current write request and determined to be unmatched (S711). Since this write data does not match any data, the write program 232 does not store a data set according to the write data in a shifted manner.

Finally, the write program 232 reports completion to the host 100 and ends the processing (S712).

Although the virtual volume 217 has been assumed in the above description, the present invention can be applied even if the volume is a normal volume (for example, Thick Volume). In such a case, for example, a method of managing an offset in copy units or a method of managing an offset in volume units can be considered. In such a manner, the present invention can be also applied to the normal volume.

In addition, it is assumed that the flash drive 240 has the deduplication function in the above description. However, the copy processing can be offloaded to the flash drive 240 even if the flash drive 240 does not have the deduplication function. In such a case, data is copied to another area in S303 of FIG. 14, and a copy destination logical address and a copy destination physical address are associated and managed. As the copy processing is offloaded to the flash drive 240, the resource of the controller 210 is not used for the copy processing. Therefore, the performance improvement of the storage system 200 is realized.

In addition, it is assumed that the physical drive is the flash drive 240 in the above description. However, the present invention can be applied even if the physical drive is another drive such as a hard disk drive.

Although the embodiments of the present invention have been described as above, the present invention is not limited to these embodiments, and, of course, can be modified in various ways within a scope not departing from a gist thereof.

For example, the storage position shift may occur for not only the data copy in the volume 217 but also data copy between the volumes 217 (for example, data copy between the volumes 217 associated with the same capacity pool based on the same RAID group).

In addition, for example, a RAID level (for example, RAID6) in which two or more parities are stored in one stripe may be adopted as the RAID level.

REFERENCE SIGNS LIST 200 storage system

The invention claimed is:

1. A storage system comprising:
a plurality of physical drives; and
a storage controller connected to the plurality of physical drives to provide one or more volumes,
wherein
two or more volume addresses, which are two or more logical addresses, belong to each of the one or more volumes,
when copy target data, which is data to be copied, is copied in a volume or between volumes, the storage controller
(A) determines whether a copy destination physical drive, which is a physical drive corresponding to a copy destination volume address, is identical to a copy source physical drive which is the destination physical drive corresponding to a copy source volume address, and
(B) shifts a storage position of the copy target data such that the copy destination physical drive becomes a physical drive identical to the copy source physical drive if a determination result of (A) is false,
the copy target data is data to be copied from a copy source area according to the copy source volume address and a copy amount which is an amount of the copy target data to a copy destination area according to the copy destination volume address and the copy amount,
the copy source physical drive is a physical drive storing a head data set,
the head data set is a data set stored at a head of the copy source area,
the copy destination physical drive is a physical drive to which the head data set is copied,
the plurality of physical drives provide a plurality of drive areas constituting a redundant array of independent (or inexpensive) disks (RAID) area,
each of the plurality of drive areas is a logical storage area constituted by two or more strips,
the RAID area is constituted by a plurality of stripes,
each of the plurality of stripes is constituted by a plurality of strips provided in each of the plurality of drive areas,
each of the copy destination area and the copy source area is an area in the RAID area,
one or more data sets are stored in one or more strips included in the copy source area, respectively,
the one or more data sets include one or more user data sets out of one or more user data sets constituting the copy target data,
two or more drive addresses, which are two or more logical addresses, belong to each of the plurality of drive areas,
a RAID level of the RAID area is a RAID level that requires at least one parity per stripe, and
in (B), for each of one or more copy destination stripes, which are one or more stripes relating to the copy destination area, the storage controller
(b1) determines whether a copy destination range in the copy destination stripe is the entire copy destination stripe,
(b2) transmits a copy command designating a copy source drive address and a copy destination drive address to each of the plurality of physical drives without processing for calculating a parity to be stored in the copy destination stripe if a determination result of (b1) is true,
a copy source drive address being a drive address of a copy source strip and the copy source strip being a drive address of a strip provided by a physical drive in a copy source stripe corresponding to the copy destination stripe, for each of the plurality of physical drives, and
a copy destination drive address being a drive address of a copy destination strip and the copy destination strip being a drive address of a strip provided by a physical drive in the copy destination stripe, for each of the plurality of physical drives, and
(b3) performs parity processing which is processing for calculating a parity to be stored in the copy destination stripe if the determination result of (b1) is false.

2. The storage system according to claim 1, wherein
when a difference between an in-stripe position of a copy destination head strip and an in-stripe position of a copy source head strip corresponds to N bytes in a first direction along the stripe (N>0), the storage controller shifts storage destinations of one or more data sets respectively stored in one or more consecutive strips including the copy source head strip by N bytes in a second direction from an end of the copy destination area in (B),
the copy destination head strip is a head strip in the copy destination area,
the copy source head strip is a head strip in the copy source area, and
the second direction is opposite to the first direction.

3. The storage system according to claim 1, wherein the parity processing includes following processes:
(f1) reading an old user data set, which is a user data set in at least one strip in the copy destination stripe; and
(f2) calculating a parity to be stored in a parity strip, which is a strip in which the parity is stored in the copy destination strip using the read old user data set.

4. The storage system according to claim 1, wherein
the parity processing includes following processes performed when there is a parity strip, which is a strip in which a parity is to be stored, in the copy destination range:
(g1) transmitting a copy command designating a copy source drive address and a copy destination drive address to each physical drive relating to the copy destination range;

(g2) generating an intermediate parity based on an old user data set, which is a user data set in a strip outside the copy destination range in the copy destination strip, and a user data set from a strip corresponding to a strip outside the copy destination range, the strip in the copy source stripe corresponding to the copy destination stripe; and (g3) commanding a physical drive that provides the parity strip to generate a new parity based on the parity to be copied in (g1) and the intermediate parity generated in (g2), and the parity processing further includes following processes performed when there is a parity strip outside the copy destination range:

(h1) commanding a physical drive relating to the copy destination range to generate an intermediate parity based on an old user data set, which is a user data set already existing in the copy destination range, and a user copy target data set to the copy destination range, the user data set of the copy target data; and (h2) commanding the physical drive that provides the parity strip to generate a new parity based on an old parity already existing in the parity strip and the intermediate parity generated in (h2).

5. The storage system according to claim 1, wherein the parity processing includes following processes:

(j1) calculating a parity to be stored in the copy destination stripe by the storage controller when the copy destination range exceeds half of the copy destination stripe; and (j2) causing a physical drive of a parity storage destination to calculate the parity to be stored in the copy destination stripe when the copy destination range is less than half of the copy destination stripe.

6. The storage system according to claim 1, wherein
the copy source volume address and the copy destination volume address are addresses designated in a copy request, and
the storage controller executes (A) and (B) in response to the copy request.

7. The storage system according to claim 1, wherein
the copy target data is data to be copied by a combination of sequential read and sequential write for the one or more volumes,
the copy source volume address is an address of a head of a range of the sequential read,
the copy destination volume address is an address of a head of a range of the sequential write, and
the storage controller executes (A) and (B) when the sequential read and the sequential write are specified.

8. The storage system according to claim 1, wherein the storage controller
(C) causes the plurality of physical drives to execute in-drive copy of the copy target data when a determination result of (A) is true.

9. A storage control method comprising:
when copy target data, which is data to be copied, is copied in a volume or between volumes among one or more volumes to which two or more volume addresses, which are two or more logical addresses, belong,
(A) determining whether a copy destination physical drive, which is a physical drive corresponding to a copy destination volume address, is identical to a copy source physical drive which is a destination physical drive corresponding to a copy source volume address; and (B) shifting a storage position of the copy target data such that the copy destination physical drive becomes a physical drive identical to the copy source physical drive if a determination result of (A) is false,
wherein
the copy target data is data to be copied from a copy source area according to the copy source volume address and a copy amount which is an amount of the copy target data to a copy destination area according to the copy destination volume address and the copy amount,
the copy source physical drive is a physical drive storing a head data set,
the head data set is a data set stored at a head of the copy source area,
the copy destination physical drive is a physical drive to which the head data set is copied,
the plurality of physical drives provide a plurality of drive areas constituting a redundant array of independent (or inexpensive) disks (RAID) area,
each of the plurality of drive areas is a logical storage area constituted by two or more strips,
the RAID area is constituted by a plurality of stripes,
each of the plurality of stripes is constituted by a plurality of strips provided in each of the plurality of drive areas,
each of the copy destination area and the copy source area is an area in the RAID area,
one or more data sets are stored in one or more strips included in the copy source area, respectively,
the one or more data sets include one or more user data sets out of one or more user data sets constituting the copy target data,
two or more drive addresses, which are two or more logical addresses, belong to each of the plurality of drive areas,
a RAID level of the RAID area is a RAID level that requires at least one parity per stripe, and
in (B), for each of one or more copy destination stripes, which are one or more stripes relating to the copy destination area, the storage controller
(b1) determines whether a copy destination range in the copy destination stripe is the entire copy destination stripe,
(b2) transmits a copy command designating a copy source drive address and a copy destination drive address to each of the plurality of physical drives without processing for calculating a parity to be stored in the copy destination stripe if a determination result of (b1) is true,
a copy source drive address being a drive address of a copy source strip and the copy source strip being a drive address of a strip provided by a physical drive in a copy source stripe corresponding to the copy destination stripe, for each of the plurality of physical drives, and
a copy destination drive address being a drive address of a copy destination strip and the copy destination strip being a drive address of a strip provided by a physical drive in the copy destination stripe, for each of the plurality of physical drives, and
(b3) performs parity processing which is processing for calculating a parity to be stored in the copy destination stripe if the determination result of (b1) is false.

10. A computer program that causes a computer to execute:

when copy target data, which is data to be copied, is copied in a volume or between volumes among one or more volumes to which two or more volume addresses, which are two or more logical addresses, belong, (A) determining whether a copy destination physical drive, which is a physical drive corresponding to a copy destination volume address, is identical to a copy source physical drive which is a destination physical drive corresponding to a copy source volume address; and (B) shifting a storage position of the copy target data such that the copy destination physical drive becomes a physical drive identical to the copy source physical drive if a determination result of (A) is false, wherein the copy target data is data to be copied from a copy source area according to the copy source volume address and a copy amount which is an amount of the copy target data to a copy destination area according to the copy destination volume address and the copy amount, the copy source physical drive is a physical drive storing a head data set, the head data set is a data set stored at a head of the copy source area, the copy destination physical drive is a physical drive to which the head data set is copied, the plurality of physical drives provide a plurality of drive areas constituting a redundant array of independent (or inexpensive) disks (RAID) area, each of the plurality of drive areas is a logical storage area constituted by two or more strips, the RAID area is constituted by a plurality of stripes, each of the plurality of stripes is constituted by a plurality of strips provided in each of the plurality of drive areas, each of the copy destination area and the copy source area is an area in the RAID area, one or more data sets are stored in one or more strips included in the copy source area, respectively, the one or more data sets include one or more user data sets out of one or more user data sets constituting the copy target data, two or more drive addresses, which are two or more logical addresses, belong to each of the plurality of drive areas, a RAID level of the RAID area is a RAID level that requires at least one parity per stripe, and in (B), for each of one or more copy destination stripes, which are one or more stripes relating to the copy destination area, the storage controller (b1) determines whether a copy destination range in the copy destination stripe is the entire copy destination stripe, (b2) transmits a copy command designating a copy source drive address and a copy destination drive address to each of the plurality of physical drives without processing for calculating a parity to be stored in the copy destination stripe if a determination result of (b1) is true, a copy source drive address being a drive address of a copy source strip and the copy source strip being a drive address of a strip provided by a physical drive in a copy source stripe corresponding to the copy destination stripe, for each of the plurality of physical drives, and a copy destination drive address being a drive address of a copy destination strip and the copy destination strip being a drive address of a strip provided by a physical drive in the copy destination stripe, for each of the plurality of physical drives, and (b3) performs parity processing which is processing for calculating a parity to be stored in the copy destination stripe if the determination result of (b1) is false.

* * * * *